(12) United States Patent
Vilermo et al.

(10) Patent No.: US 12,196,869 B2
(45) Date of Patent: Jan. 14, 2025

(54) AUDIO PROCESSING OF MULTI-CHANNEL AUDIO SIGNALS

(71) Applicant: NOKIA TECHNOLOGIES OY, Espoo (FI)

(72) Inventors: Miikka Vilermo, Siuro (FI); Mikko Tammi, Tampere (FI); Toni Mäkinen, Pirkkala (FI); Juha Vilkamo, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 139 days.

(21) Appl. No.: 17/614,306

(22) PCT Filed: May 19, 2020

(86) PCT No.: PCT/FI2020/050333
§ 371 (c)(1),
(2) Date: Nov. 24, 2021

(87) PCT Pub. No.: WO2020/240079
PCT Pub. Date: Dec. 3, 2020

(65) Prior Publication Data
US 2022/0260664 A1    Aug. 18, 2022

(30) Foreign Application Priority Data
May 29, 2019  (GB) ...................................... 1907570

(51) Int. Cl.
*G01S 3/805*     (2006.01)
*G01S 3/80*      (2006.01)
(Continued)

(52) U.S. Cl.
CPC ............ *G01S 3/805* (2013.01); *G01S 3/8006* (2013.01); *G10L 19/008* (2013.01); *H04R 3/005* (2013.01);
(Continued)

(58) Field of Classification Search
CPC ..... G01S 3/805; G01S 3/8006; G10L 19/008; G10L 2021/02166; H04R 3/005; H04R 2203/12; H04R 2430/23; H04R 2499/15
See application file for complete search history.

(56) References Cited

U.S. PATENT DOCUMENTS 9,076,450 B1   7/2015  Sadek et al.
9,313,599 B2   4/2016  Tammi et al.
(Continued)

FOREIGN PATENT DOCUMENTS

CN   101843114 A   9/2010
CN   102084418 A   6/2011
(Continued)

OTHER PUBLICATIONS

Adel et al., "Beamforming Techniques for Multichannel Audio Signal Separation", International Journal of Digital Content Technology and its Applications 6(20), arXiv, (Dec. 2012), 9 pages.
(Continued)

*Primary Examiner* — Mark Fischer
(74) *Attorney, Agent, or Firm* — ALSTON & BIRD LLP

(57) ABSTRACT

A method for audio focusing is provided, the method comprising: receiving a multi-channel audio signal that represents sounds in sound directions that correspond to respective positions in an image area of an image; receiving an indication of an audio focus direction that corresponds to a first position in the image area; selecting a primary sound direction from a plurality of different available candidate directions, wherein said plurality of different available candidate directions comprise said audio focus direction and one or more offset candidate directions and wherein each offset candidate direction corresponds to a respective candidate offset from said first position in the image area; and deriving, based on said multi-channel audio signal in depen-
(Continued)

dence of the selected primary sound direction, an output audio signal.

13 Claims, 10 Drawing Sheets

(51) Int. Cl.
*G10L 19/008* (2013.01)
*H04R 3/00* (2006.01)
*G10L 21/0216* (2013.01)

(52) U.S. Cl.
CPC ...... *G10L 2021/02166* (2013.01); *H04R 2203/12* (2013.01); *H04R 2430/23* (2013.01); *H04R 2499/15* (2013.01)

(56) References Cited

U.S. PATENT DOCUMENTS

| | | | |
|---|---|---|---|
| 2009/0116652 A1 | 5/2009 | Kirkeby et al. | |
| 2011/0060434 A1 | 3/2011 | Bowler et al. | |
| 2011/0103591 A1 | 5/2011 | Ojala | |
| 2013/0156220 A1 | 6/2013 | Bar-Zeev et al. | |
| 2016/0011851 A1 | 1/2016 | Zhang et al. | |
| 2016/0249134 A1* | 8/2016 | Wang | H04R 3/005 |
| 2017/0178662 A1 | 6/2017 | Ayrapetian et al. | |
| 2017/0287499 A1 | 10/2017 | Duong et al. | |
| 2017/0374453 A1 | 12/2017 | Tawada | |
| 2018/0288307 A1 | 10/2018 | Allie et al. | |
| 2019/0104360 A1 | 4/2019 | Bou Daher et al. | |
| 2019/0172426 A1 | 6/2019 | Ni | |

FOREIGN PATENT DOCUMENTS

| | | |
|---|---|---|
| CN | 108370411 A | 8/2018 |
| CN | 108475511 A | 8/2018 |
| CN | 108831498 A | 11/2018 |
| CN | 109076306 A | 12/2018 |
| EP | 3200186 A1 | 8/2017 |
| GB | 2549922 A | 11/2017 |
| WO | WO 2014/090277 A1 | 6/2014 |
| WO | WO 2014/162171 | 10/2014 |
| WO | WO 2017/178309 A1 | 10/2017 |
| WO | WO 2018/127447 A1 | 7/2018 |

OTHER PUBLICATIONS

International Search Report and Written Opinion for Patent Cooperation Treaty Application No. PCT/FI2020/050333 dated Sep. 10, 2020, 15 pages.
Search Report for United Kingdom Application No. GB1907570.4 dated Nov. 25, 2019.
Extended European Search Report for European Application No. 20813166.4 dated Jun. 1, 2023, 8 pages.
Office Action for Chinese Application No. 202080039259.0 Jul. 2, 2024, 20 pages.

\* cited by examiner

400

Receive a multi-channel audio signal that represents sounds in sound directions that map to respective positions in an image area of an image
402

Receive an indication of an audio focus direction that corresponds to a first position in the image area
404

Select a primary sound direction such that it corresponds to a second position in the image area, which second position is offset from said first position in a direction that brings it further away from a center point of the image area
406

Derive, based on said multi-channel audio signal in dependence of the selected primary sound direction, an output audio signal where sounds in sound directions defined via the selected primary sound direction are empahsized in relation to sounds in sound directions other than those defined via the selected primary sound direction
408

502
Receive a multi-channel audio signal that represents sounds in sound directions that correspond to respective poistions in an image area of an image

504
Receive an indication of an audio focus direction that corresponds to a first position in the image area

506
Select a primary sound direction from a plurality of different available candidate directions, wherein said plurality of different available candiate directions comprise the received audio focus direction and one or more offset candidate directions and wherein each offset candidate direction corresponds to a respective candidate offset from said first position in the image area

508
Derive, based on said multi-channel audio signal in dependence of the selected primary sound direction, an output audio signal where sounds in sound directions defined via the selected primary sound direction are empahsized in relation to sounds in sound directions other than those defined via the primary sound direction

Figure 8

AUDIO PROCESSING OF MULTI-CHANNEL AUDIO SIGNALS

CROSS-REFERENCE TO RELATED APPLICATIONS

This application is a national phase entry of International Application No. PCT/FI2020/050333, filed May 19, 2020, which claims priority to Great Britain Application No. 1907570.4, filed May 29, 2019, the entire contents of which are incorporated herein by reference.

TECHNICAL FIELD

The example and non-limiting embodiments of the present invention relate to processing of multi-channel audio signals. In particular, various embodiments of the present invention relate to deriving a beamformed audio signal on basis of a multi-channel audio signal.

BACKGROUND

Already for many years, mobile devices such as mobile phones and tablet computers have been provided with a camera and a microphone arrangement that enable the user of the device to simultaneously capture audio and video. With the development of microphone technologies and with increase in processing power and storage capacity available in mobile devices, providing such mobile devices with multi-microphone arrangements that enable capturing multi-channel audio is becoming increasingly common, which in turn enables processing the captured multi-channel audio into spatial audio to accompany video captured at the same time.

Typically, the process of capturing a multi-channel audio signal using the mobile device comprises operating a microphone array arranged in the mobile device to capture a plurality of microphone signals and processing the captured microphone signals into a recorded multi-channel audio signal for further processing in the mobile device, for storage in the mobile device and/or for transmission to one or more other devices together with the associated video. In a typical scenario, the user of the mobile device aims at recording a multi-channel audio signal that represents the audio scene corresponding to the field of view (FOV) of the camera, thereby enabling a comprehensive representation of the audio-visual scene at the time of capture.

Upon capturing or rendering the audio-visual scene, the user may wish to apply audio focusing to emphasize sounds in some directions of the audio scene and/or de-emphasize sounds in some other directions of the audio scene. Audio focusing solutions that are based on beamforming techniques known in the art enable, for example, amplifying sounds arriving from selected directions that may also correspond to a respective sub-portion of the FOV of the video, thereby providing audio with emphasis on sounds arriving from a direction of the audio scene corresponding to the selected sub-portion of the FOV that may depict an object of interest.

However, in practical implementations the number of available microphone signals and respective locations of the microphones in the mobile device as well as limitations of the available beamforming techniques impose limitations to the selectivity of the audio focusing and/or audio quality of the resulting audio signals. In particular, the microphone signals available at the mobile device typically enable only beamforming that results in relatively wide beam due to the limitations in generating arbitrarily spatially selective beam patterns, where a single beam pattern may be amplify sounds originating from multiple sound sources that reside in the region where the beam pattern has a large amplitude, with respect to sounds originating from sound sources that reside in the region where the beam pattern has a smaller amplitude. This feature of beamforming or spatial filtering can be conceptualized as a focus region, where the focus region consists of the directions where the amplitude of the beam pattern is relatively high. In practice, the beam patterns may vary over frequency (and time depending on the beamforming technique), and the beam patterns may have side lobes, and thus it is understood that the term focus region is here a conceptual one illustrating the main capture area of the focus processing. Known beamforming techniques typically do not allow a sharp boundary between sound arriving within the focus region and sound arriving from direction outside the focus region and therefore in a practical scenario the attenuation of sounds residing outside the focus region gradually increases with increasing distance from the focus region. Consequently, sounds originating from sound sources that are outside the focus region but relatively close to the focus region are typically not attenuated to a sufficient extent.

Hence, in a practical implementation, in a scenario where the captured multi-channel audio signal represents two or more sound sources that are in respective spatial positions that are relatively close to each other, the audio focusing typically emphasizes sounds originating from all these sound sources even though the user sets or centers the audio focus to a single sound source of interest. Moreover, in such a scenario the user moving the center of audio focus from one sound source to another may have only a negligible (if any) effect on the resulting processed audio. Both these aspects limit the applicability of audio focusing solutions and, in many cases, result in compromised user experience.

SUMMARY

According to an example embodiment, a method for audio focusing is provided, the method comprising: receiving a multi-channel audio signal that represents sounds in sound directions that correspond to respective positions in an image area of an image; receiving an indication of an audio focus direction that corresponds to a first position in the image area; selecting a primary sound direction such that it corresponds to a second position in the image area that is offset from said first position in a direction that brings it further away from a center point of the image area; and deriving, based on said multi-channel audio signal in dependence of the selected primary sound direction, an output audio signal where sounds in sound directions defined via the selected primary sound direction are emphasized in relation to sounds in sound directions other than those defined via the selected primary sound direction.

According to another example embodiment, a method for audio focusing is provided, the method comprising: receiving a multi-channel audio signal that represents sounds in sound directions that correspond to respective positions in an image area of an image; receiving an indication of an audio focus direction that corresponds to a first position in the image area; selecting a primary sound direction from a plurality of different available candidate directions, wherein said plurality of different available candidate directions comprise said audio focus direction and one or more offset candidate directions and wherein each offset candidate direction corresponds to a respective candidate offset from said first position in the image area; and deriving, based on said multi-channel audio signal in dependence of the selected primary sound direction, an output audio signal where sounds in sound directions defined via the selected primary sound direction are emphasized in relation to sounds in sound directions other than those defined via the selected primary sound direction.

According to another example embodiment, an apparatus for audio focusing is provided, the apparatus configured to: receive a multi-channel audio signal that represents sounds in sound directions that correspond to respective positions in an image area of an image; receive an indication of an audio focus direction that corresponds to a first position in the image area; select a primary sound direction such that it corresponds to a second position in the image area that is offset from said first position in a direction that brings it further away from a center point of the image area; and derive, based on said multi-channel audio signal in dependence of the selected primary sound direction, an output audio signal where sounds in sound directions defined via the selected primary sound direction are emphasized in relation to sounds in sound directions other than those defined via the selected primary sound direction.

According to another example embodiment, an apparatus for audio focusing is provided, the apparatus configured to: receive a multi-channel audio signal that represents sounds in sound directions that correspond to respective positions in an image area of an image; receive an indication of an audio focus direction that corresponds to a first position in the image area; select a primary sound direction from a plurality of different available candidate directions, wherein said plurality of different available candidate directions comprise said audio focus direction and one or more offset candidate directions and wherein each offset candidate direction corresponds to a respective candidate offset from said first position in the image area; and derive, based on said multi-channel audio signal in dependence of the selected primary sound direction, an output audio signal where sounds in sound directions defined via the selected primary sound direction are emphasized in relation to sounds in sound directions other than those defined via the selected primary sound direction.

According to another example embodiment, an apparatus for audio focusing is provided, the apparatus comprising: means for receiving a multi-channel audio signal that represents sounds in sound directions that correspond to respective positions in an image area of an image; means for receiving an indication of an audio focus direction that corresponds to a first position in the image area; means for selecting a primary sound direction such that it corresponds to a second position in the image area that is offset from said first position in a direction that brings it further away from a center point of the image area; and means for deriving, based on said multi-channel audio signal in dependence of the selected primary sound direction, an output audio signal where sounds in sound directions defined via the selected primary sound direction are emphasized in relation to sounds in sound directions other than those defined via the selected primary sound direction.

According to another example embodiment, an apparatus for audio focusing is provided, the apparatus comprising: means for receiving a multi-channel audio signal that represents sounds in sound directions that correspond to respective positions in an image area of an image; means for receiving an indication of an audio focus direction that corresponds to a first position in the image area; means for selecting a primary sound direction from a plurality of different available candidate directions, wherein said plurality of different available candidate directions comprise said audio focus direction and one or more offset candidate directions and wherein each offset candidate direction corresponds to a respective candidate offset from said first position in the image area; and means for deriving, based on said multi-channel audio signal in dependence of the selected primary sound direction, an output audio signal where sounds in sound directions defined via the selected primary sound direction are emphasized in relation to sounds in sound directions other than those defined via the selected primary sound direction.

According to another example embodiment, an apparatus for audio focusing is provided, wherein the apparatus comprises at least one processor; and at least one memory including computer program code, which, when executed by the at least one processor, causes the apparatus to: receive a multi-channel audio signal that represents sounds in sound directions that correspond to respective positions in an image area of an image; receive an indication of an audio focus direction that corresponds to a first position in the image area; select a primary sound direction such that it corresponds to a second position in the image area that is offset from said first position in a direction that brings it further away from a center point of the image area; and derive, based on said multi-channel audio signal in dependence of the selected primary sound direction, an output audio signal where sounds in sound directions defined via the selected primary sound direction are emphasized in relation to sounds in sound directions other than those defined via the selected primary sound direction.

According to another example embodiment, an apparatus for audio focusing is provided, wherein the apparatus comprises at least one processor; and at least one memory including computer program code, which, when executed by the at least one processor, causes the apparatus to: receive a multi-channel audio signal that represents sounds in sound directions that correspond to respective positions in an image area of an image; receive an indication of an audio focus direction that corresponds to a first position in the image area; select a primary sound direction from a plurality of different available candidate directions, wherein said plurality of different available candidate directions comprise said audio focus direction and one or more offset candidate directions and wherein each offset candidate direction corresponds to a respective candidate offset from said first position in the image area; and derive, based on said multi-channel audio signal in dependence of the selected primary sound direction, an output audio signal where sounds in sound directions defined via the selected primary sound direction are emphasized in relation to sounds in sound directions other than those defined via the selected primary sound direction.

According to another example embodiment, a computer program for audio focusing is provided, the computer program comprising computer readable program code configured to cause performing at least a method according to an example embodiment described in the foregoing when said program code is executed on a computing apparatus.

The computer program according to an example embodiment may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to an example embodiment of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where

FIG. 5 illustrates a flowchart depicting a method according to an example;

FIG. 8 illustrates a flowchart depicting a method according to an example;

DESCRIPTION OF SOME EMBODIMENTS

Figure 1A:
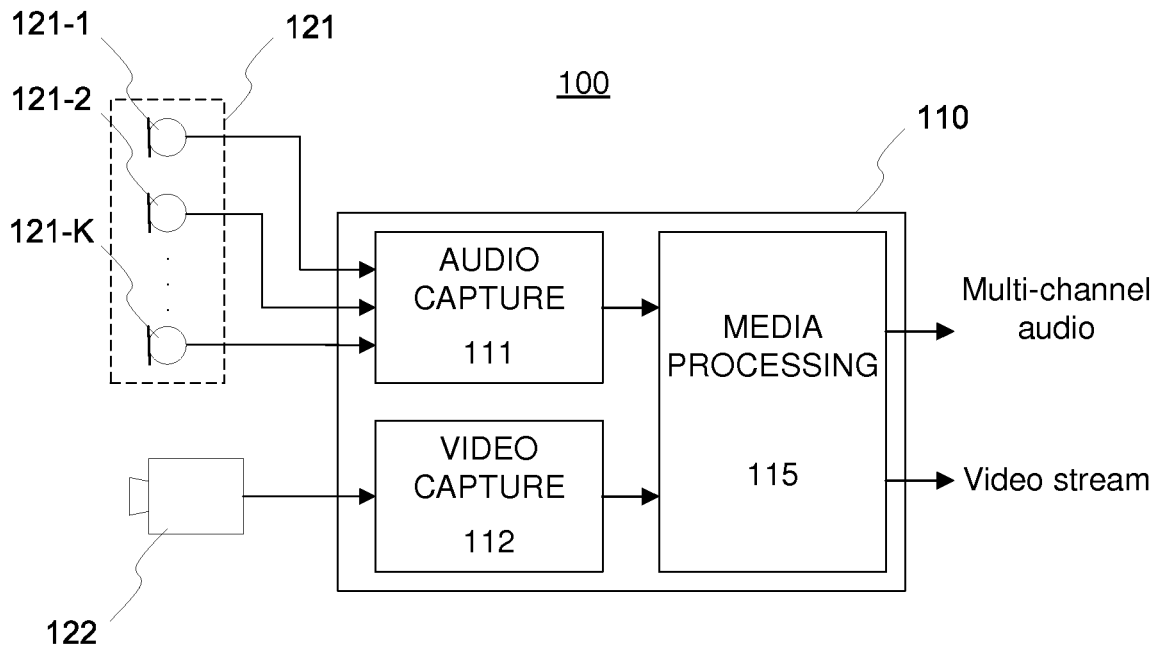
FIG. 1A illustrates a block diagram of some components and/or entities of a media capturing arrangement according to an example.
Figure 1B:
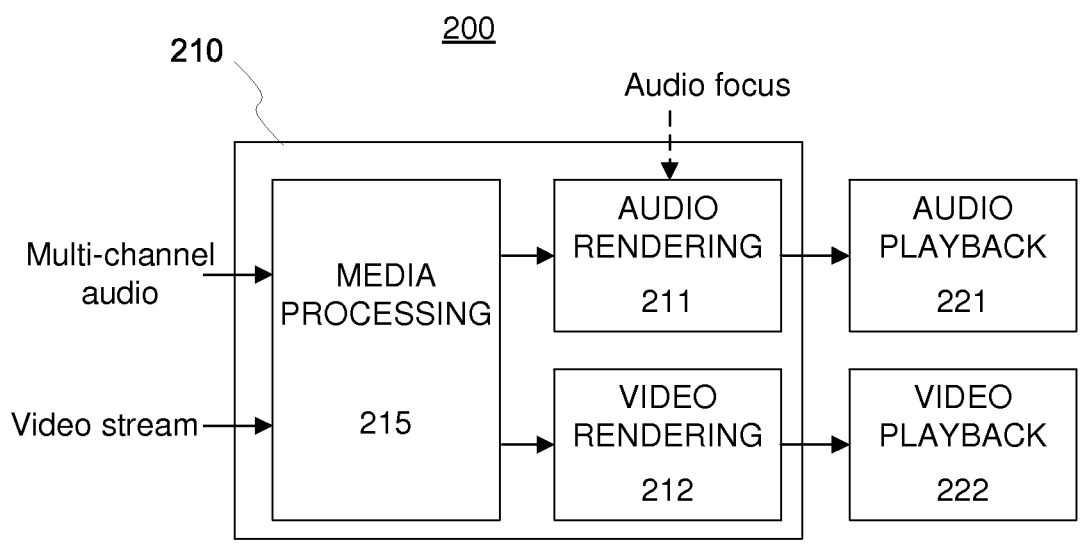
FIG. 1B illustrates a block diagram of some components and/or entities of a media rendering arrangement according to an example.

FIG. 1A illustrates a block diagram of some components and/or entities of a media capturing arrangement 100 according to an example. The media capturing arrangement 100 comprises a media capturing entity 110 that includes an audio capturing entity 111, a video capturing entity 112 and a media processing entity 115. FIG. 1B illustrates a block diagram of some components and/or entities of a media rendering arrangement 200 according to an example. The media rendering arrangement 200 comprises a media rendering entity 210 that includes an audio rendering entity 211, a video rendering entity 212 and a media processing entity 215.

The audio capturing entity 111 is coupled to a microphone array 121 and it is arranged to receive respective microphone signals from a plurality of microphones 121-1, 121-2, ..., 121-K and to record a captured multi-channel audio signal based on the received microphone signals. The microphones 121-1, 121-2, ..., 121-K represent a plurality of (i.e. two or more) microphones, where an individual one of the microphones may be referred to as a microphone 121-$k$. Herein, the concept of microphone array 121 is to be construed broadly, encompassing any arrangement of two or more microphones 121-$k$ arranged in or coupled to a device implementing the media capturing arrangement 100. The video capturing entity 112 is coupled to a camera entity 122 and it is arranged to receive images from the camera entity 122 and to record the images as a captured video stream. The camera entity 122 may comprise, for example, a digital video camera device or a digital video camera module. The media processing entity 115 may be arranged to control at least some aspects of operation of the audio capturing entity 111 and the video capturing entity 112.

Each microphone signal provides a different representation of the captured sound, which difference depends on the positions of the microphones 121-$k$ with respect to each other. For a sound source in a certain spatial position with respect to the microphone array 121, this results in a different representation of sounds originating from the certain sound source in each of the microphone signals: a microphone 121-$k$ that is closer to the certain sound source captures the sound originating therefrom at a higher amplitude and earlier than a microphone 121-$j$ that is further away from the certain sound source. Together with the knowledge regarding the positions of the microphones 121-$k$ with respect to each other, such differences in amplitude and/or time delay enable using the microphone signals as basis for extracting or amplifying an audio signal that represents sounds arriving from a desired direction with respect to the microphone array 121 and/or converting microphone signals into a spatial audio signal that provides a spatial representation of the captured audio where sounds originating from sound sources in the environment of the microphone array 121 at the time of capturing are perceived to arrive at their respective directions with respect to the microphone array 121. Audio processing techniques for extracting or amplifying an audio signal that represents sound arriving from a desired direction with respect to the microphone array 121 and for converting the microphone signals into a spatial audio signal are well known in the art and they are described in further detail in the present disclosure only to an extent necessary for understanding certain aspects of the audio focus processing disclosed herein.

Hence, the microphone signals from the microphone array 121 serves as a multi-channel audio signal that represents sounds captured in a range of sound directions with respect to the microphone array. In the following, the range of sound directions represented by the microphone signals or a spatial audio signal derived therefrom is predominantly referred to as a spatial audio image captured at the position of the microphone array 121, whereas an audio signal derived from the microphone signals and that represents the sound arriving from the desired direction with respect to the microphone array 121 may be considered to represent a respective sound direction within the spatial audio image. Since the microphone array 121 and the camera entity 122 are operated in the same physical location, the multi-channel audio signal formed by or derived from the microphone signals represents sounds in sound directions that correspond to respective positions in an image area of images obtained from the camera entity 122. With the known characteristics of the image sensor of the camera entity 122 and its position and orientation with respect to the microphone array 121, there may be at least an approximate predefined mapping between spatial position of an image area of the images obtained from the camera entity 122 and corresponding sound directions within the spatial audio image represented by the microphone signals received from the microphone array 121 and, consequently, each position in the image area may be mapped to a corresponding sound direction in the spatial audio image represented by the microphone signals and vice versa. Hence, the correspondence between a sound direction and a position in the image area may be defined, for example, via a mapping function.

Figure 2A:
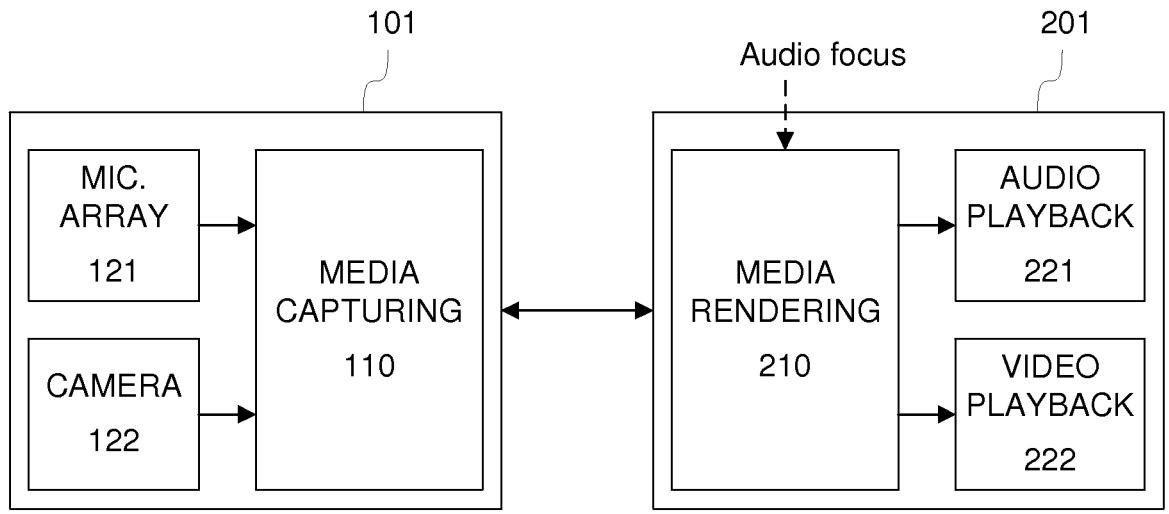
FIG. 2A illustrates an arrangement for implementing the media capturing arrangement and the media rendering arrangement according to an example.

The media processing entity 115 may be further arranged to provide the captured multi-channel audio signal and the captured video stream to the media rendering arrangement 200. In this regard, the media capturing arrangement 100 may be implemented in a first device 101 and the media rendering arrangement 200 may be implemented in a second device 201, as illustrated by the block diagram of FIG. 2A. The provision may comprise transmitting the captured multi-channel audio signal and the captured video stream over a communication network from the first device 101 to the second device 201, for example, as respective audio and video packet streams. In this example, processing in the media processing entity 115 may comprise encoding the captured multi-channel signal and encoding the captured video stream for transmission in the respective audio and video packet streams to the second device 102, whereas processing in the media processing entity 215 may comprise, for example, decoding a reconstructed multi-channel audio signal based on the received audio packet stream and providing the reconstructed multi-channel audio signal for further audio processing in the audio rendering entity 211 and decoding a reconstructed video stream based on the received video packet stream and providing the reconstructed video stream for further video processing in the video rendering entity 212.

Figure 2B:
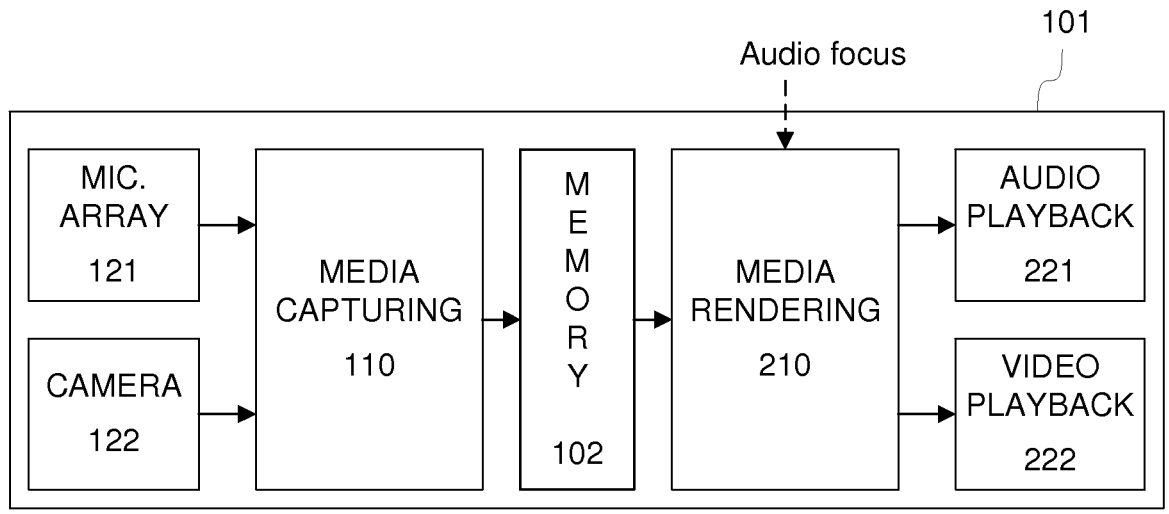
FIG. 2B illustrates an arrangement for implementing the media capturing arrangement and the media rendering arrangement according to an example.
Figure 2C:
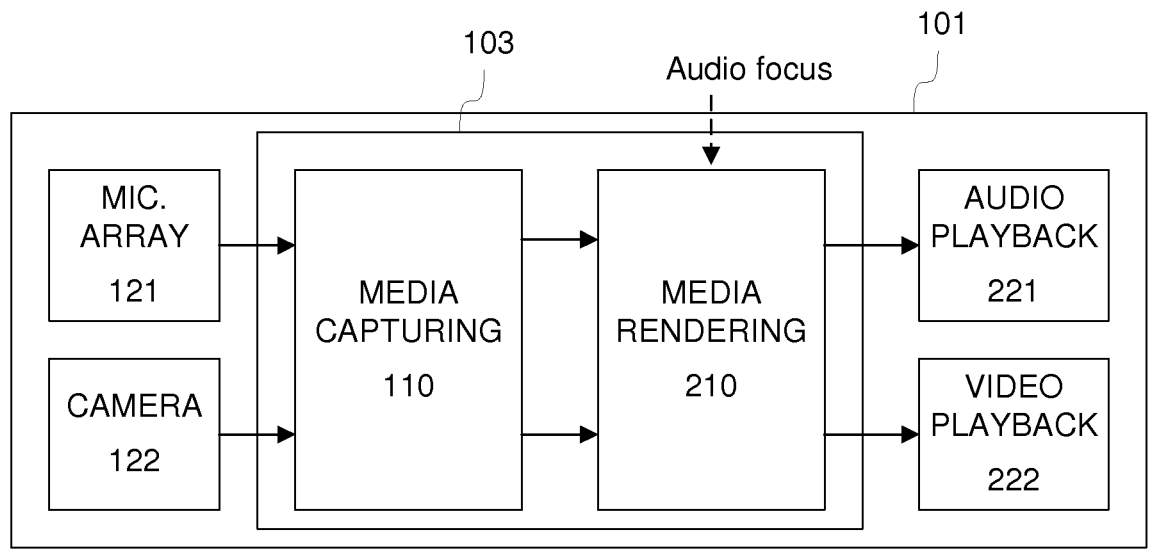
FIG. 2C illustrates an arrangement for implementing the media capturing arrangement and the media rendering arrangement according to an example.

In other examples, the media capturing arrangement 100 and the media rendering arrangement 200 may be implemented in the first device 101, as illustrated by the respective block diagrams of FIGS. 2B and 2C. In the example of FIG. 2B, the provision of the multi-channel audio signal and the captured video stream may comprise the media capturing arrangement 100 storing the captured multi-channel audio signal and the captured video stream into a memory 102 and the media rendering arrangement 200 reading the captured multi-channel audio signal and the captured video stream from the memory 102. In the example of FIG. 2C, the media rendering arrangement 200 receives the captured multi-channel audio signal and the captured video stream directly from the media capturing arrangement 100. In this example, the media capturing arrangement 100 and the media rendering arrangement 200 may be implemented as a single logical entity, which may be referred to as a media processing arrangement 103. In the examples of FIGS. 2B and 2C, the respective encoding and decoding of the captured multi-channel audio signal and the captured video stream may not be necessary and hence the media processing entity 215 may provide the captured audio signal to the audio rendering entity 211 and provide the captured video stream to the video rendering entity 212 either directly (FIG. 2C) or via the memory 102 (FIG. 2B).

The audio rendering entity 211 may be arranged to apply audio focus processing to the multi-channel audio signal received thereat in order to extract or emphasize sounds in a desired audio focus direction of the spatial audio image represented by the received multi-channel audio signal. In this regard, the audio focus processing may result in, for example, a single-channel audio signal that represents (at least) sounds in the desired audio focus direction or a multi-channel audio signal with a focused audio component, where the sounds in the desired audio focus direction are emphasized in relation to sounds in other sound directions of the audio image. In case the output comprises the multi-channel audio signal with a focused audio component, the audio rendering entity 211 may be further arranged to process the multi-channel audio signal with the focused audio component into a predefined or selected spatial audio format that is suitable for audio playback by the audio playback entity 221 (e.g. a loudspeaker system or headphones). The video rending entity 212 may process the video stream received thereat into a format suitable for video rendering by the video playback entity 222 (e.g. a display device).

In case the processing in the media processing entities 115, 215 comprises respective steps of encoding and decoding the captured multi-channel audio signal into the reconstructed multi-channel audio signal and encoding and decoding the captured video stream into the reconstructed video stream, media processing in this regard may be carried out by using techniques known in the art, and hence no further details in this regard are provided in this disclosure. Moreover, some aspects of the audio processing carried out by the audio rendering entity 211, such as processing the reconstructed audio stream into a desired spatial audio format, may be likewise carried out by using techniques known in the art and hence no further details in this regard are provided in this disclosure.

Figure 3A:
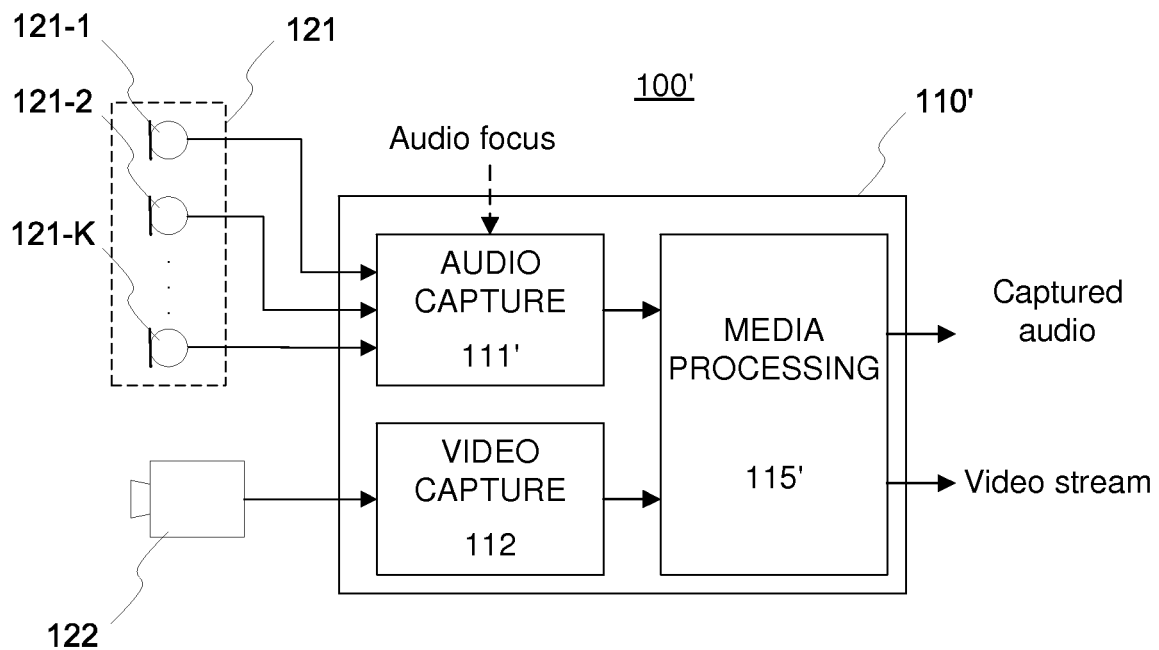
FIG. 3A illustrates a block diagram of some components and/or entities of a media capturing arrangement according to an example.
Figure 3B:
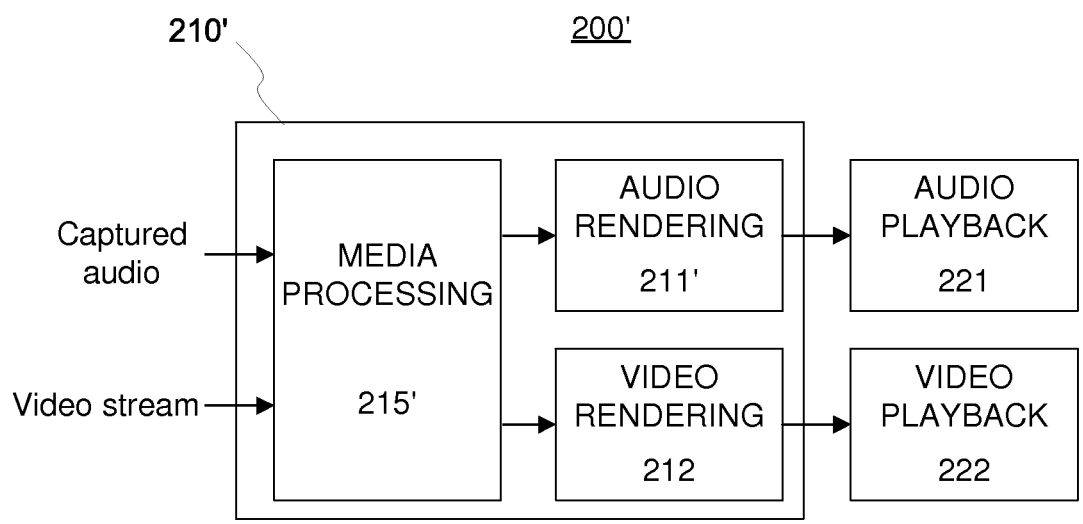
FIG. 3B illustrates a block diagram of some components and/or entities of a media rendering arrangement according to an example.

FIG. 3A illustrates a block diagram of some components and/or entities of a media capturing arrangement 100' according to an example and FIG. 3B illustrates a block diagram of some components and/or entities of a media rendering arrangement 200' according to an example. The media capturing arrangement 100' comprises a media capturing entity 110' that includes an audio capturing entity 111', the video capturing entity 112 and a media processing entity 115'. The media rendering arrangement 200' comprises a media rendering entity 210' that includes an audio rendering entity 211', the video rendering entity 212 and a media processing entity 215'. The system including the media capturing arrangement 100' and the media rendering arrangement 200' differs from the one including the media capturing arrangement 100 and the media rendering arrangement 200 in that the audio focus processing for extracting or emphasizing sounds arriving from a desired audio focus direction described in the foregoing with references to the audio rendering entity 211 is applied in the audio capturing entity 111', whereas no audio focusing takes place in the audio rendering entity 211.

The audio focus processing in the audio capturing entity 111' may result in, for example, a single-channel audio signal that represents (at least) sounds in the desired audio focus direction of the spatial audio image or a multi-channel audio signal with a focused audio component, where the sounds in the desired audio focus direction are emphasized in relation to sounds positioned in other sound directions of the audio image. In the latter case, the media processing entity 115' may further process the multi-channel audio signal with the focused audio component into a predefined or selected spatial audio format that makes it readily suitable for audio playback by an audio playback entity (e.g. the audio playback entity 221). Regardless of the format of the audio signal resulting from the processing applied in the audio capturing entity 111' and the media processing entity 115', the audio output from the media capturing entity 110' is referred to as a captured audio signal, which may be transferred from the media capturing entity 110' to the media rendering entity 210' in a manner similar to that described in the foregoing for the captured multi-channel audio signal with references to FIGS. 2A, 2B and 2C, mutatis mutandis.

Along the lines described in the foregoing, audio focus processing (e.g. in the audio capturing entity 111' or in the audio rendering entity 211) aims at emphasizing sounds in a sound direction of interest in relation to sounds in other sound directions in accordance with an audio focus indication provided as input to a respective one of the audio capturing entity 111' or the audio rendering entity 211. The audio focus indication defines at least an audio focus direction of interest within the spatial audio image represented by the multi-channel audio signal and the audio focus indication may further define an audio focus amount that indicates a desired strength of the emphasis to be applied for sounds in the audio focus direction. In the following, the audio focus processing is described via a non-limiting example that refers to audio focus processing carried out in the audio rendering entity 211, while it readily generalizes into audio focus processing carried in the audio capturing entity 111' (e.g. based on a multi-channel signal constituted by or derived from the microphone signals) or by another entity.

As described in the foregoing, a sound direction within the spatial audio image is associated with a position in an image area of an image of the accompanying video stream e.g. via the mapping described in the foregoing and, conversely, a position in the image area is associated with a sound direction within the spatial audio image. Consequently, the audio focus direction may be mapped to corresponding position of the image area and, vice versa, a position of the image area that illustrates a sound source of interest may be mapped to the audio focus direction within the spatial audio image.

In an example, the audio focus direction received at the audio capturing entity 111' corresponds to a single (fixed or static) sound direction that remains the same or substantially the same over time (e.g. from one image to another in images of the video stream) and it may be selected by the user or by another element of the media capturing entity 110'. In another example, the audio focus direction received at the audio capturing entity 111' corresponds to a sound direction that varies over time (e.g. from one image to another in images of the video stream) and it may be derived by another element of the media capturing entity 110' e.g. via tracking of the image area position of an object of interest (e.g. one selected by a user) over time. Similar considerations apply to reception of the audio focus direction in the audio rendering entity 211 as well, mutatis mutandis. The audio focus processing described in the present disclosure may be carried out at the capture time (e.g. in the audio capturing entity 111') or as a post-processing stage after the capture time (e.g. in the audio capturing entity 111' or in the audio rendering entity 121).

The audio focus processing may comprise application of a predefined beamforming technique on the multi-channel audio signal received at the audio rendering entity 211 to extract a beamformed (single-channel or multi-channel) audio signal that represents sounds in the desired audio focus direction of the spatial audio image represented by the multi-channel audio signal. In some examples, the beamformed audio signal may be further applied as basis for creating a focused (multi-channel) audio component where the beamformed audio signal is repositioned in its original spatial position of the spatial audio image, and combining the focused audio component with the multi-channel audio signal in view of the desired audio focus amount (or in view of a predefined audio focus amount, in case no desired audio focus amount is specified) to create the multi-channel audio signal with a focused audio component. In this regard, combination of the focused audio component with the multi-channel audio signal may comprise amplifying (e.g. multiplying) the focused audio component by a first scaling factor that represents the desired or predefined audio focus amount or attenuating (e.g. multiplying) the multi-channel audio signal by a second scaling factor that represents the desired or predefined audio focus amount. In a further example, the combination of the focused audio component with the multi-channel audio signal may comprise amplifying (e.g. multiplying) the focused audio component by a first scaling factor and attenuating (e.g. multiplying) the multi-channel audio signal by a second scaling factor, where the first and second scaling factors jointly represent the desired or predefined audio focus amount.

The beamforming technique applied by the audio rendering entity 211 in creation of the beamformed audio signal may comprise using a suitable beamformer known in the art. Due to the limited spatial selectivity of the beamforming techniques known in the art, in a practical implementation the beamformed audio signal does not only represent sound strictly positioned in the desired audio focus direction of the spatial audio image but the beamformed audio signal represents sounds within an audio focus region surrounding the desired audio focus direction within the spatial audio image, thereby representing sounds in the desired audio focus direction together with sounds within a beamformer-technique-dependent sound directions around the desired audio focus direction. Typically, apart from side lobes and fluctuations in the beam patterns, the attenuation (or suppression) of sound sources in sound directions around the desired audio focus direction generally increases with increasing distance from the desired audio focus direction, where the extent of attenuation depends on the applied beamforming technique and/or positioning of the microphones 121-$k$ (with respect to each other and with respect to the desired audio focus direction) applied in capturing the underlying multi-channel audio signal. In this regard, the audio focus region may be considered to encompass those sound directions in which the sounds are not substantially attenuated, whereas sounds in sound directions outside the audio focus region are substantially attenuated.

Beamformers known in the art may be categorized as dynamic beamformers and static beamformers. An example of a dynamic beamformer is Minimum Variance Distortionless Response (MVDR) beamformer and an example of a static beamformer is a Phase Shift (PS) beamformer. Typically, a dynamic beamformer such as the MVDR achieves a smaller audio focus region and, in particular, better suppression of discrete sound sources in sound directions outside the audio focus region than a static beamformer such as PS. However, this advantage of dynamic beamformers is typically provided at the expense of decreased quality of the beamformed audio signal in comparison to that obtained via usage of a static beamformer due to increased probability of audio distortions in the beamformed audio signal. Computational complexity of dynamic beamformers is also typically higher than that of static ones. The trade-off between size of the resulting audio focus region and/or the extent or probability of distortions in the resulting beamformed audio signal may be further adjusted to some extent via selection of parameters of the applied beamformer, e.g. the white noise gain of the beamformer. The spatial portion of the spatial audio image represented by the multi-channel audio signal covered by a certain audio focus region is hence, at least in part, defined via a primary sound direction of the audio focus region, characteristics of the applied beamformer and possibly also via the applied beamformer parameters.

Along the lines discussed in the foregoing, the actual shape and size of an audio focus region arranged in view of a given desired audio focus direction may depend, for example, on the applied beamforming technique, relative positions of the microphones 121-$k$ of the microphone array 121 applied for capturing the underlying multi-channel audio signal and/or the position of the desired audio focus direction within the spatial audio image. Moreover, the shape and size of the audio focus region may be different at different frequencies (e.g. at different frequency sub-bands). Therefore, although some figures of the present disclosure illustrate audio focus regions as circles for graphical clarity of illustration, in a practical implementation an audio focus region may have a somewhat arbitrary shape having an 'envelope' that resembles a circle (or an oval) but that it is not strictly circular (or strictly oval-shaped).

In the following, position of an audio focus region with respect to the spatial audio image is described via a primary sound direction of the audio focus region such that setting or selecting a certain sound direction of the spatial audio image as the primary direction results in positioning the audio focus region around the primary direction. In other words, the main amplifying directions of the beam pattern are around the primary sound direction. Hence, beamforming based on a primary sound direction results in a beamformed audio signal where sounds in sound directions defined via the primary sound direction are emphasized in relation to sounds in sound directions other than those defined via the primary sound direction. The primary sound direction may be considered as a conceptual center point of the audio focus region, even though due to somewhat arbitrary shape of the audio focus region and differences in size and shape across frequencies it may not be a geometrical center point of the audio focus region. Conceptually, though, the primary sound direction may be considered to represent a center point of the audio focus region. In an example, the primary sound direction of an audio focus region comprises the sound direction in which sounds are maximally amplified compared to other directions. In some examples the primary sound direction of an audio focus region comprises the sound direction in which sounds are maximally amplified with respect to other directions within the image area, i.e. there may be stronger amplification in some sound directions that map outside the image area but these are not taken into account. Nevertheless, in context of the present disclosure, the relative position of an audio focus region resulting from selection of the primary sound direction within the spatial audio image plays a more important role than its absolute position and hence the concept of 'primary sound direction' serves as a sufficient position reference for the purposes of the present disclosure.

In the following description, expressions suggesting that the primary sound direction of an audio focus region is arranged/set/positioned in a certain position of the image area may be applied. Quite obviously, such an expression as such makes limited sense. However, such a condensed expression is applied, in the interest of improved readability of the present disclosure, to mean that the primary sound direction is arranged/set/positioned in the spatial audio image in a sound direction that maps to the certain position of the image area. Likewise, the following text may employ expressions suggesting that an audio focus region overlaps/covers a certain spatial position or portion of the image area as a condensed version of the full expression meaning that an audio focus region encompasses one or more sound directions of the spatial audio image that map to the certain spatial position or portion of the image area.

In a scenario where the multi-channel audio is accompanied by the video stream, a user is typically primarily interested in sounds arriving within the image area of images that constitute the associated video stream (defined e.g. by the FOV of the camera entity 122) while sounds arriving outside the image area may be ignored without a significant effect to the perceived quality of the resulting audio-visual representation of the scene. On the other hand, the spatial audio image represented by the multi-channel audio signal may extend to also cover sound directions that are outside the image area. In this regard, the audio rendering entity 211 may be arranged to suppress or attenuate sounds in sound directions of the spatial audio image that originate from sound sources that are outside the image area of the images of the video stream. As described in the foregoing, due to the limited spatial selectivity of the beamforming techniques known in the art, in a practical implementation the beamformed audio signal necessarily represents sounds within an audio focus region around the desired audio focus direction (instead of strictly representing sound(s) of the desired audio focus direction only) via substantially attenuating (or even suppressing) sounds in sound directions outside the audio focus region while not substantially attenuating sounds in sound directions within the audio focus region. Consequently, the beamformed audio signal does not only represent the sound originating from an object illustrated in a desired point in the image area of the video stream but also represents sounds originating objects within a portion of image area around the desired point.

In the course of operation of the audio rendering entity 211, the user may select an audio focus direction of interest via a user interface (UI) of the device 101, 201 that implements the audio rendering entity 211. As an example in this regard, the audio rendering entity 211 may receive, via the UI, a selection of a position of the image area depicting the desired audio focus direction and map the selected position of the image area into a corresponding sound direction in the spatial audio image. In another example, the audio rendering entity 211 may receive, via the UI, a selection of an object depicted in the image area, apply suitable image analysis techniques to identify the position of the object in the image area in images of the video stream and in each considered image map the identified position of the object in the image area into a corresponding sound direction in the spatial audio image. In previously known solutions, the beamforming is carried out using this sound direction as the primary sound direction that results in an audio focus region that is positioned at the sound direction of the spatial audio image to which the selected position of the image area maps. Herein, even though the user does not directly select the audio focus direction, the sound direction of the spatial audio image that gets selected in response to the user-selected image area position or in response to tracked image area position of the user-selected object illustrated in the image(s) may be referred to as a user-selected (or received) audio focus direction. Consequently, the audio rendering entity 211 carries out the beamforming based on the user-selected audio focus direction, which results in an audio focus region that encompasses sound directions around the user-selected audio focus direction and, consequently, in audio focusing that emphasizes sounds in all sound directions of the spatial audio image that are within the audio focus region resulting from the beamforming carried out based on the user-selected audio focus direction in relation to sounds in sound directions of the spatial audio image that are outside the resulting audio focus region.

Figure 4:
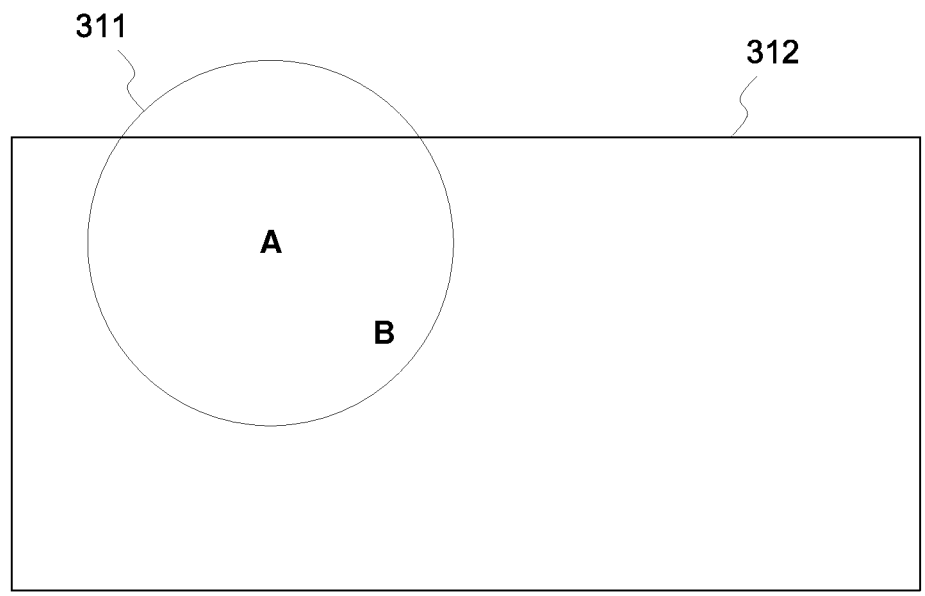
FIG. 4 schematically illustrates a mapping of an audio focus region and two sound sources in an image area according to an example.

Along the lines discussed in the foregoing, the above-described approach serves to provide audio focusing that encompasses sounds in the user-selected audio focus direction, while at the same time it may provide audio focusing that inadvertently also encompasses sounds in sound directions around the desired one. FIG. 4 schematically illustrates an example in this regard, where a first object is depicted in position A of the image area 312 and a second object is depicted in position B of the image area 312, where the first and second objects represent respective sound sources within the spatial audio image. Assuming that a user would like to set the audio focus to sounds originating from the first object, the resulting audio focus region 311 covers a portion of the image area surrounding the position A. However, due to limitations in spatial selectivity of the applied beamforming technique, the audio focus region 311 also encompasses the second object in the position B of the image area. Consequently, instead of emphasizing the sound originating from the first object depicted in the position A in relation to the sound originating from the second object depicted in the position B, beamforming carried out using the audio focus region 311 results in emphasizing both the sound originating from the first object and the sound originating from the second object, which in many cases results in compromised user experience with respect to the audio focus processing.

Improved audio focusing may be obtained, for example, via operation according to a method 400 illustrated by a flowchart depicted in FIG. 5. The method 400 may be carried, for example, by the audio capturing entity 111' or the audio rendering entity 211. The operations described with references to blocks 402 to 408 of the method 400 may be varied or complemented in a number of ways without departing from the scope of the audio focus processing according to the present disclosure, for example in accordance with the examples described in the foregoing and in the following.

The method 400 commences from receiving a multi-channel audio signal that represents sounds in sound directions that correspond to respective positions in an image area of an image, as indicated in block 402. Herein, the image comprises an image of the video stream received at the media processing entity 215 or an image derived therefrom. The method 400 further comprises receiving an indication of the audio focus direction that corresponds to a first position in the image area, as indicated in block 404.

The method 400 further comprises selecting a primary sound direction that corresponds to a second position in the image area that is offset from the first position in the image area in a direction that brings it further away from the center point of the image area, as indicated in block 406, and deriving, based on the multi-channel audio signal and in dependence of the primary sound direction, an output audio signal where sounds in sound directions defined via the selected primary sound direction are emphasized in relation to sounds in sound directions other than those defined via the selected primary sound direction, as indicated in block 408.

In the following, non-limiting examples pertaining to operations of block 406 are provided. In this regard, selection of the primary sound direction for deriving the output audio signal as well as the resulting arrangement of the audio focus region with respect to their (mapped) positions in the image area are described in more detail. Throughout the examples pertaining to the method 400, the primary sound direction is selected such that (in addition to the primary sound direction also) the received audio focus direction is included in the audio focus region around the primary sound direction. In the following description, the term 'received focus position' is applied to refer to the position of the image area to which the received audio focus direction maps (i.e. the 'first position' referred to above in context of blocks 404 and 406) and the term 'shifted focus position' is applied to refer to the position to which the selected primary sound direction maps (i.e. the 'second position' referred to above in context of block 406). Hence, the shifted focus position is arranged in an image area position such that the distance between the shifted focus position and the center point of the image area is longer than the distance between the received focus position and the center point of the image area, thereby shifting the provided audio focus to encompass sound directions that map to image area positions that are further away from the center of the image area in comparison sound directions that map to the received focus position.

Moreover, the references in the following with respect to shifting or offsetting the received focus position into the shifted focus position imply adjusting the received audio focus direction within the spatial audio image that maps to the received focus position into the selected primary sound direction within the spatial audio image that maps to the shifted focus position. Hence, shifting or offsetting the received focus position in the image area into the shifted focus position in the image area is basically a consequence of shifting or offsetting the audio focus direction into the primary sound direction in the spatial audio image but, for brevity and clarity of the description, the following examples predominantly refer to such shifting the audio focus direction within the spatial audio image as shifting or offsetting that takes place in the image plane.

According to a first example, the shifted focus position is offset from the received focus position in one or both of a horizontal direction of the image plane and a vertical direction of the image plane such that the point of the image area to which the primary sound direction maps is brought further away from the center point of the image area. The terms horizontal direction and vertical direction are used herein in a non-limiting manner, encompassing any pair of a first direction and a second direction that are perpendicular to each other. The extent of offset is selected such that the audio focus region resulting from usage of the applied beamformer (also) encompasses the received audio focus direction.

Figure 6A:
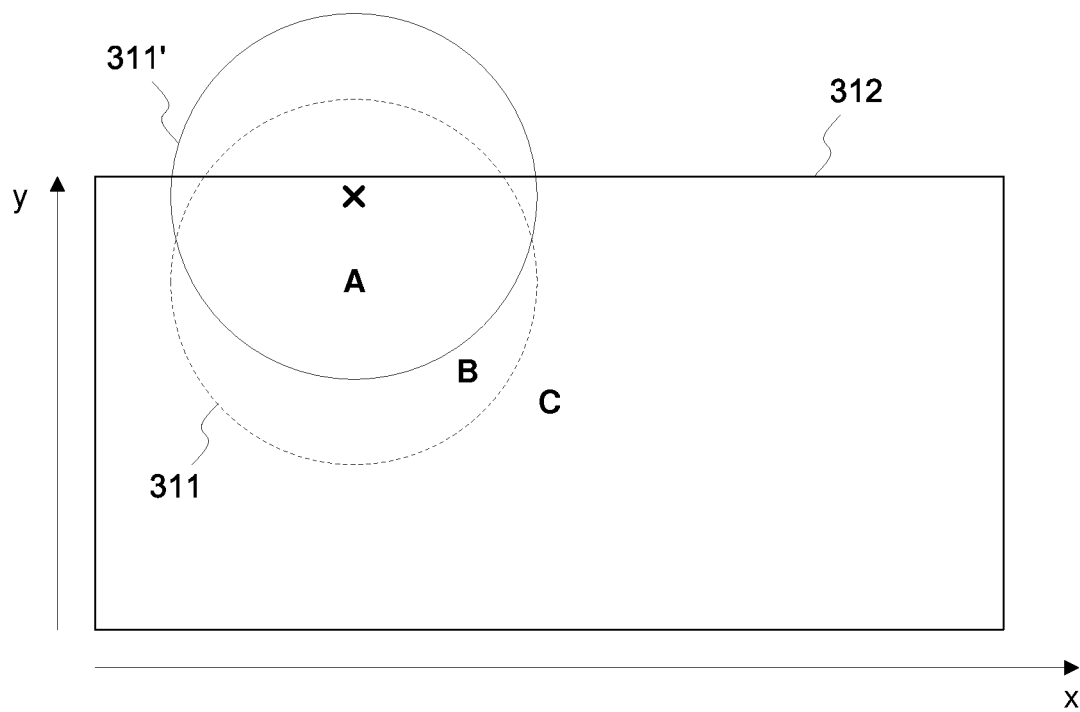
FIG. 6A schematically illustrates offsetting the focus position in the image area according to an example.

Proceeding from the example of FIG. 4 and further assuming that the received audio focus direction maps to (the first object depicted in) the position A in the image area, FIG. 6A schematically illustrates an example in this regard, where the shifted focus position is offset from the received focus position in vertical direction of the image plane (indicated by an axis y in the illustration of FIG. 6A). Therein, the solid circle represents an offset audio focus region 311' resulting from shifting the audio focus direction from the user-selected one, whereas the dashed circle represents the audio focus region 311 according to the example of FIG. 4.

In the example of FIG. 6A, the primary sound direction is selected such that it results in the shifted focus position that maps to a position of the image area indicated in the illustration of FIG. 6A by a cross, thereby providing the shifted focus position whose distance to the center point of the image area (indicated by C in the illustration of FIG. 6A) is longer than that of the position A. Consequently, with a sufficient offset, the resulting offset audio focus region 311' is shifted such that the sounds originating from the direction that maps to (the second object depicted in) the position B in the image area are not included in the offset audio focus region 311' while the audio focus region 311 encompasses sounds in the received audio focus direction that maps to the position A of the image area. Hence, beamforming that employs the offset audio focus region 311' enables obtaining a beamformed audio signal where the sounds in the sound directions that map to the position A in the image are emphasized also with respect to sounds in the sound direction that map to the position B in the image area.

Figure 6B:
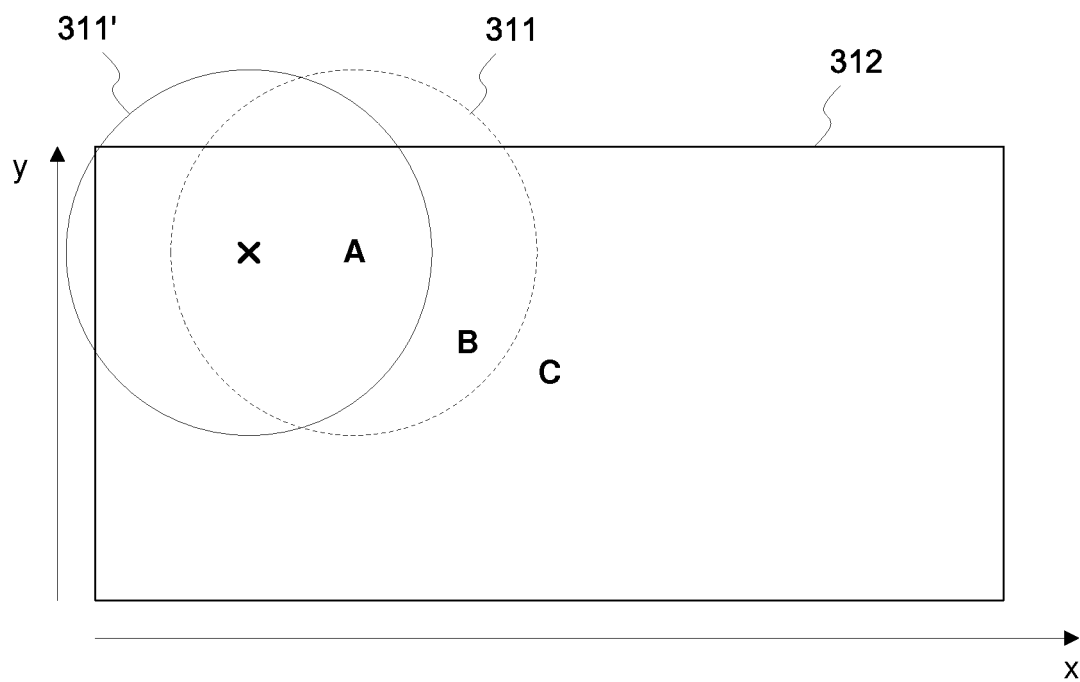
FIG. 6B schematically illustrates offsetting the focus position in the image area according to an example.

FIG. 6B schematically illustrates an example, where the shifted focus position is offset from the received focus position in the horizontal direction of the image plane (indicated by the axis x in the illustration of FIG. 6B) such that it is brought further away from the center point of the image area at the position C. Again, the solid circle represents the offset audio focus region 311' resulting from shifting the audio focus direction from the received one, whereas the dashed circle represents the audio focus region 311 according to the example of FIG. 4. As illustrated in the FIG. 6B, with a sufficient offset, the resulting offset audio focus region 311' is shifted such that the sounds originating from the direction that maps to (the second object depicted in) the position B in the image area are not included in the offset audio focus region 311' while the audio focus region 311 encompasses sounds in the received audio focus direction that maps to the position A of the image area.

Figure 6C:
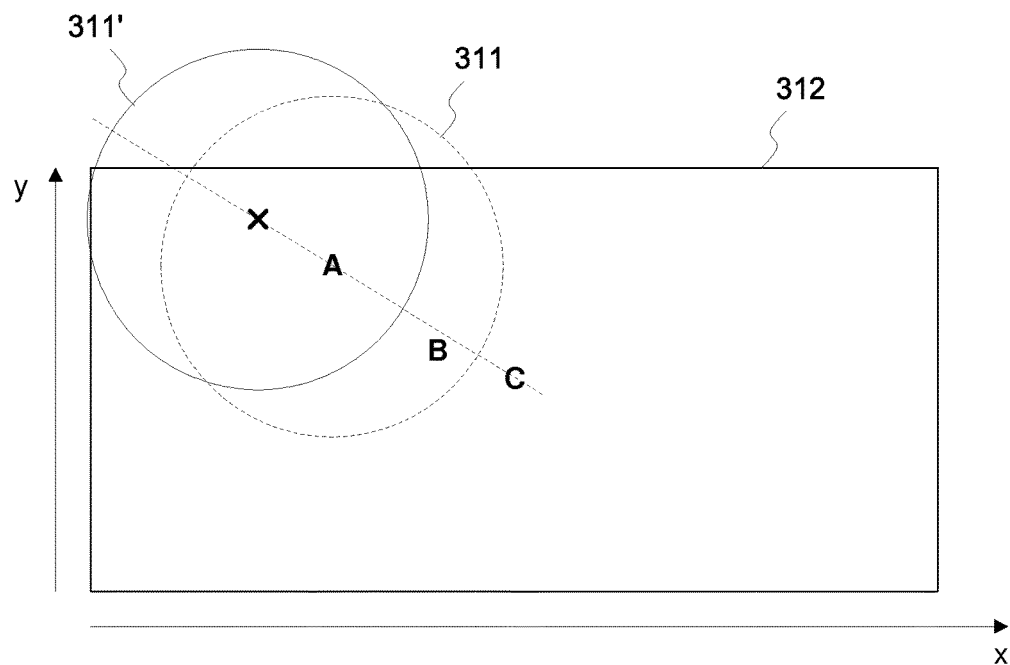
FIG. 6C schematically illustrates offsetting the focus position in the image area according to an example.

FIG. 6C schematically illustrates a further example, where the shifted focus position is offset from the received focus position in both the horizontal direction and the vertical direction of the image plane (indicated, respectively by the axes x and y in the illustration of FIG. 6C). In this example, the focus position is shifted along a (conceptual) line that intersects both the center point of the image area in the position C and the received focus position at position A such that it is brought further away from the center of the image area. Again, the solid circle represents the offset audio focus region 311' resulting from shifting the audio focus direction from the received one, whereas the dashed circle represents the audio focus region 311 according to the example of FIG. 4. As illustrated in the FIG. 6C, with a sufficient offset, the resulting offset audio focus region 311' is shifted such that the sounds originating from the direction that maps to (the second object depicted in) the position B in the image area are not included in the offset audio focus region 311' while the audio focus region 311 encompasses sounds in the received audio focus direction that maps to the position A of the image area.

Both the extent and direction of offset may be predefined ones, with the above-described condition that the direction of offset results in the shifted focus point that is further away from the center point of the image area in comparison to the received focus point. Even though predefined extent and direction of offset do not guarantee providing the shifted audio focus region 311' that excludes sounds from prominent sound sources that are in sound directions relatively close to the sound source of interest and map to a position that resides within the image area, it nevertheless increases the likelihood of excluding such sound sources from the beamformed audio signal, thereby enabling improved audio focusing.

In one example, a predefined extent of offset that is independent of the position of the received focus position in the image area may be applied. In other words, the same predefined extent of offset may be applied for all received focus positions. In another example, the extent of offset is dependent on the position of the received focus position in the image area such that the extent of offset increases with increasing distance between the received focus position and the center point of the image area. In a further example, the image area may be (at least conceptually) divided into a plurality of non-overlapping image portions and a respective predefined extent of offset is applied in dependence of the image portion within which the received focus position is located. As an example in this regard, the extent of offset may be larger in image portions that are further away from the center point of the image area in comparison to the extent of offset in image portions that are closer to the center point of the image area.

As further examples pertaining to the extent of offset, the offset may be applied only for those received focus positions that are further than a (first) predefined distance from the center point of the image area (in other words, the extent of offset may be zero for received focus positions that are within the (first) predefined distance from the center point of the image area), the extent of offset may be limited such that it remains within the image area, and/or the extent of offset may be limited such that it does not extend outside the image area by more than a predefined threshold distance.

In an example, a predefined direction of offset that is independent of the position of the received focus position in the image area may be applied. In other words, the same predefined direction of offset may be applied for all received focus positions. In another example, the direction of offset may be selected in dependence of a location of the received focus position in the image area such that the image area may be (at least conceptually) divided into a plurality of non-overlapping image portions and a respective predefined direction of offset is applied in dependence of the image portion within which the received focus position is located. As an example in this regard, in image portions that are bounded by a single edge of the image area (e.g. image portions adjacent to one of the top, bottom, left and right edges of the image area) the direction of offset may be in the vertical or in the horizontal direction of the image plane such that the shifted focus point is closer to the side of the image portion bounded by the edge of the image area than the to the opposite side of the image portion that is bounded by another image portion, in image portions that are bounded by two non-opposite edges of the image area (e.g. image portions in corners of the image area) the direction of the offset may be provided both in the horizontal and vertical directions, e.g.

along the (conceptual) line that intersects the center point of the image area and the received focus point and/or in image portions that are not bounded by any edge of the image area (e.g. image portions that are bounded by adjacent image portions in all sides) the direction of the offset may in one or both of the horizontal and vertical directions of the image plane or, alternatively, no offset may be applied in such image portions.

The sound directions encompassed by the offset audio focus region 311' are further dependent on the choice of beamforming technique applied for creating the beamformed audio signal in dependence of the shifted focus position. As an example in this regard, a predefined beamformer may be applied in deriving the beamformed audio signal. In another example, operations pertaining to block 406 may further comprise selecting a beamformer or a type of beamformer to be applied in deriving the beamformed audio signal. In an example, the same beamformer and/or a beamformer of the same or similar type may be applied regardless of the position of the received focus position in the image area, where the applied beamformer may be a static beamformer such as PS or a dynamic beamformer such as MVDR. In another example, the applied beamformer or the applied beamformer type may be selected in dependence of the position of the received focus position in the image area e.g. such that a dynamic beamformer is applied for received focus positions that are closer than a (second) predefined distance from the center point of the image area whereas while a static beamformer is applied for received focus positions that are further than the (second) predefined distance from the center point of the image area. In a further example, the applied beamformer or the applied beamformer type may be selected in dependence of the received focus position in the image area such that the image area may be (at least conceptually) divided into a plurality of non-overlapping image portions and a beamformer or a beamformer type assigned to the image portion within which the received focus position is located is applied. As an example in this regard, a dynamic beamformer may be assigned to image portions that are bounded by a single edge of the image area (e.g. image portions adjacent to one of the top bottom, left and right edges of the image area) and to image portions that are not bounded by any edge of the image area (e.g. image portions that are bounded by adjacent image portions in all sides) and/or a static beamformer may be assigned to image portions that are bounded by two adjacent edges of the image area (e.g. image portions in corners of the image area).

The above-described selection of the beamformer or the beamformer type in dependence of the position of the received focus position results in, depending on details of the chosen approach, using a dynamic beamformer (that typically enables a smaller size of an audio focus region with an increased risk of audio distortions) near the center of the image area and using a static beamformer (that typically results in a larger size of an audio focus region with a reduced risk of audio distortions) closer to the edges and/or corners of the image area, thereby (further) reducing the likelihood of providing the shifted audio focus region 311' such that it excludes sounds from prominent sound sources in sound directions that are relatively close to the sound direction of the sound source of interest and map to a position that resides within the image area.

Figure 7:
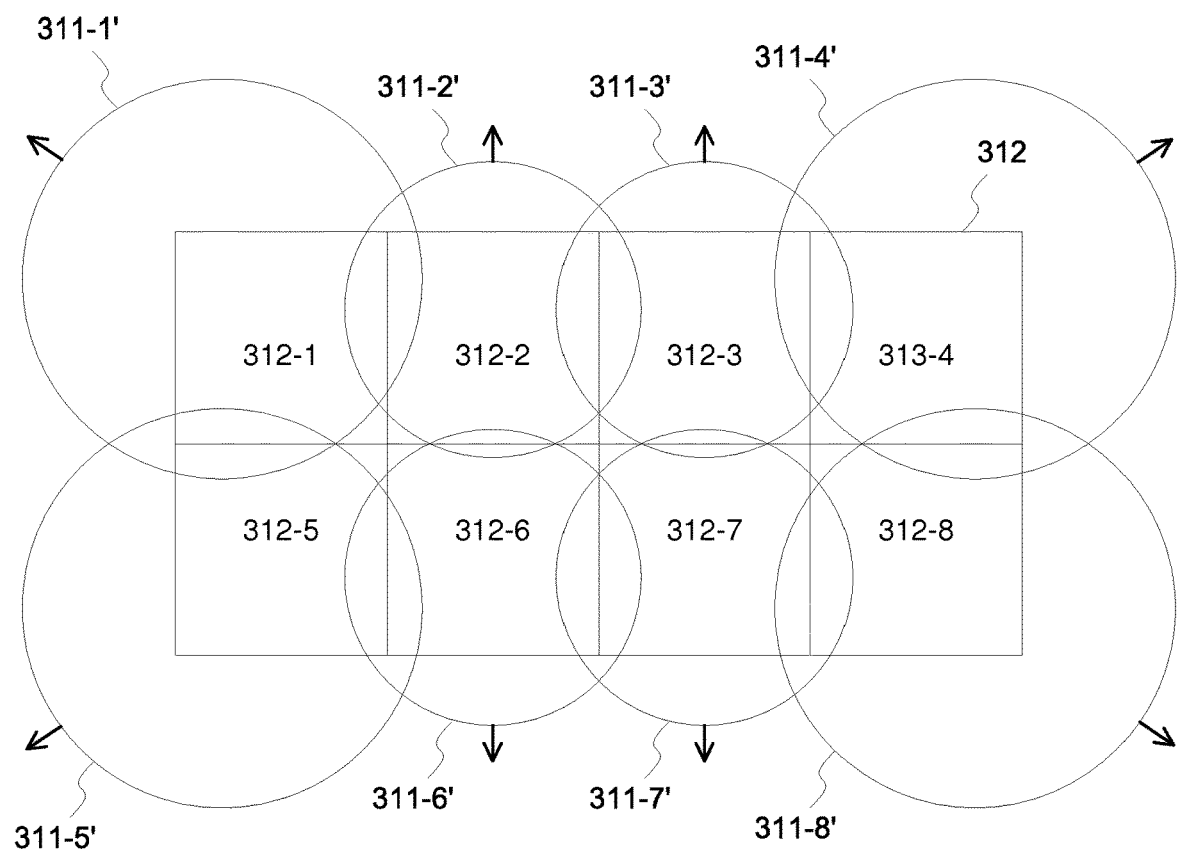
FIG. 7 schematically illustrates division of an image area into image portions and shifting of audio focus regions according to an example.

A non-limiting example that makes use of a division of the image area into a set of non-overlapping rectangular image portions is schematically illustrated in FIG. 7, whereas in other examples image portions of some other shape (e.g. hexagonal) may be applied instead. Therein, the image area 312 is divided into eight image portions labelled 312-1 to 312-8, each shown with a respective exemplifying shifted audio focus region 311-1' to 311-8'. It should be noted that the illustration of FIG. 7 does not depict absolute positions of the shifted audio focus regions 311-$j$' with respect to the respective image portions 312-$j$ but rather serves to indicate respective directions with respect to the center point of the image area 312 into which the received focus position is shifted to define the respective shifted focus position (see the arrows extending outwards from the circles that represent the audio focus regions 311-$j$'). Moreover, the respective sizes of the audio focus regions 311-$j$' serve to indicate the type of beamformer assigned to the respective image portion 312-$j$: a larger circle represents a static beamformer (such as PS) and a smaller circle represents a dynamic beamformer (such as MVDR). Hence, in the example of FIG. 7 it may be assumed that a dynamic beamformer is assigned to the image portions 312-2, 312-3, 312-6, 312-7 while the direction of offset is in the vertical direction of the image plane towards the closer one of the top and bottom edges of the image area 312, whereas a static beamformer is assigned to the image portions 312-1, 312-4, 312-5, 312-8 while the direction of offset is both in the horizontal and vertical directions of the image plane in a general direction towards the respective corner of the image area.

Referring now to operations pertaining to block 408, deriving the output audio signal may comprise, for example, using the predefined or selected beamformer to extract, from the received multi-channel audio signal, a beamformed audio signal that represents sounds in sound directions within the audio focus region 311' around the selected primary sound direction of the spatial audio image, where the beamformed audio signal may comprise a single-channel audio signal or a multi-channel audio signal. As described in the foregoing, the resulting offset audio focus region 311' also encompasses sounds in the received audio focus direction, the beamformed audio signal thereby serving as an audio signal where sounds in the received audio focus direction are emphasized in relation to sounds in sound directions that are outside the audio focus region 311'.

In an example, the beamformed audio signal is provided as the output audio signal. In another example, operations pertaining to block 408 may further comprise or be followed by composing, based on the received multi-channel audio signal and the beamformed audio signal, a multi-channel output audio signal with a focused audio component where sounds in sound directions within the audio focus region 311' around the selected primary sound direction of the spatial audio image are emphasized in relation to sounds in sound directions that are outside the audio focus region 311'. Typically, only sound directions that map to positions inside the image area are considered and the amplification and/or attenuation of sounds in sound directions that map to positions outside the image area are ignored.

Derivation of such a multi-channel output audio signal may comprise deriving a focused (multi-channel) audio component where the beamformed audio signal is repositioned in its original spatial position of the spatial audio image, and combining the focused audio component with the received multi-channel audio signal in view of the desired audio focus amount (or in view of a predefined audio focus amount, in case no desired audio focus amount is specified) to create the multi-channel output audio signal with a focused audio component. As an example in this regard, combination of the focused audio component with the multi-channel audio signal may comprise amplifying (e.g. multiplying) the focused audio component by a first scaling factor that represents the desired or predefined audio focus amount or attenuating (e.g. multiplying) the received multi-channel audio signal by a second scaling factor that represents the desired or predefined audio focus amount. In a further example, the combination of the focused audio component with the multi-channel audio signal may comprise amplifying (e.g. multiplying) the focused audio component by a first scaling factor and attenuating (e.g. multiplying) the multi-channel audio signal by a second scaling factor, where the first and second scaling factors jointly represent the desired or predefined audio focus amount. The multi-channel output audio signal may be provided as or (further) processed into e.g. a two-channel binaural audio signal or a multi-channel surround signal according to a predefined channel configuration (such as 5.1-channel surround sound or 7.1-channel surround sound).

Still referring to the first example, the extent of offset, the direction of offset and/or the applied beamformer or beamformer type may be selected or defined differently at different frequency sub-bands. In an example, the extent of offset, the direction of offset and/or the applied beamformer or beamformer type may be selected or defined as described above for one or more first frequency sub-bands while for one or more second frequency sub-bands no offset (or a smaller offset) may be applied and/or a predefined beamformer or beamformer type may be applied.

According to a second example, respective two or more microphones 121-$k$ of the microphone array 121 are assumed to be located on both sides of an image sensor of the camera entity 122, which typically results in audio focus regions 311, 311' that are smaller in size close(r) to the center of the image area in comparison to their size close(r) to the sides of the image area (e.g. closer to those edges of the image area that corresponds to respective edges of the image sensor that are adjacent to said two or more microphones 121-$k$) even when the same or similar beamformer or beamforming type is applied for each of the audio focus regions 311, 311'. In this regard, in the second example the beamformer may be a predefined one, e.g. a static beamformer such as the PS or a dynamic beamformer such as the MVDR. Hence, in context of the second example selection of the primary sound direction (cf. block 406) and derivation of the output audio signal (cf. block 408) may be carried out in a manner described in the foregoing for the first example apart from (possible) selection of the beamformer or the beamformer type in dependence of the position of the received focus position in the image area (to which the received audio focus direction maps).

Still referring to the second example, the extent of offset and/or the direction of offset may be selected or defined differently at different frequency sub-bands. In an example, the extent of offset and/or the direction of offset may be selected or defined as described above for one or more first frequency sub-bands (e.g. for frequency sub-bands below a predefined frequency threshold) while for one or more second frequency sub-bands (e.g. for frequency sub-bands above the predefined frequency threshold) no offset (or a smaller offset) may be applied.

According to a third example, the issues with previously known approaches for audio focusing discussed with references to FIG. 4 are addressed in a manner somewhat different from that of the method 400 and/or the examples pertaining to FIGS. 6A, 6B, 6C and 7. In this regard, improved audio focusing may be provided, for example, according to a method 500 illustrated by a flowchart depicted in FIG. 8. The operations described with references to blocks 502 to 508 of the method 500 may be varied or complemented in a number of ways without departing from the scope of the audio focus processing according to the present disclosure, for example in accordance with the examples described in the foregoing and in the following.

The method 500 commences from receiving a multi-channel audio signal that represents sounds in sound directions that correspond to respective positions in an image area of an image, as indicated in block 502. The method 500 further comprises receiving an indication of the audio focus direction that corresponds to a first position in the image area, as indicated in block 504. Herein, the operations pertaining to blocks 502 and 504 are, respectively, similar to those described with references to block 402 and 404 in context of the method 400.

The method 500 further comprises selecting a primary sound direction from a plurality of different available candidate directions, where each candidate direction corresponds to a respective candidate offset from the first position, as indicated in block 506. In this regard, the offset may be in any direction on the image plane. The method 500 further comprises deriving, based on the multi-channel audio signal and in dependence of the primary sound direction, an output audio signal where sounds in sound directions defined via the selected primary sound direction are emphasized in relation to sounds in sound directions other than those defined via the primary sound direction, as indicated in block 508. Throughout the examples pertaining to the method 500, the primary sound direction is selected such that (in addition to the primary sound direction also) the received audio focus direction is included in the audio focus region around the primary sound direction. Non-limiting examples of operations pertaining to blocks 506 and 508 are described in the following.

Referring now to operations pertaining to block 506 of the method 500, as described in the foregoing, the primary sound direction may be selected from the plurality of different available candidate sound directions (i.e. two or more different available candidate sound directions), which plurality of different available candidate sound directions comprise the received audio focus direction and one or more offset candidate directions, each of which may be described e.g. via a respective candidate offset with respect to the image area position to which the received audio focus direction maps. In this regard, each of the candidate offsets may define a respective pair of a direction of offset and an extent of offset in the image plane, in other words the direction and distance of the respective candidate shifted focus position with respect to the received focus position, the direction of offset may be in any direction image plane. The same or similar beamformer is applicable for deriving a respective candidate beamformed audio signal using each of the candidate sound directions, thereby enabling derivation of the respective candidate beamformed audio signal based on a respective candidate audio focus region around the respective candidate sound direction. Due to usage of the same or similar beamformer, each candidate audio focus region has substantially the same size in terms of sound directions encompassed by the respective candidate audio focus region. For each offset candidate sound direction the extent of offset is selected such that the respective candidate audio focus region encompasses the received audio focus direction in view of characteristics of the applied beamformer. Since each of the candidate audio focus regions encompass the received audio focus direction, they necessary partially overlap with each other. On the other hand, each of the candidate audio focus regions further encompasses a range of directions around the audio focus direction that is different from that encompassed by the other candidate audio focus regions.

Figure 9:
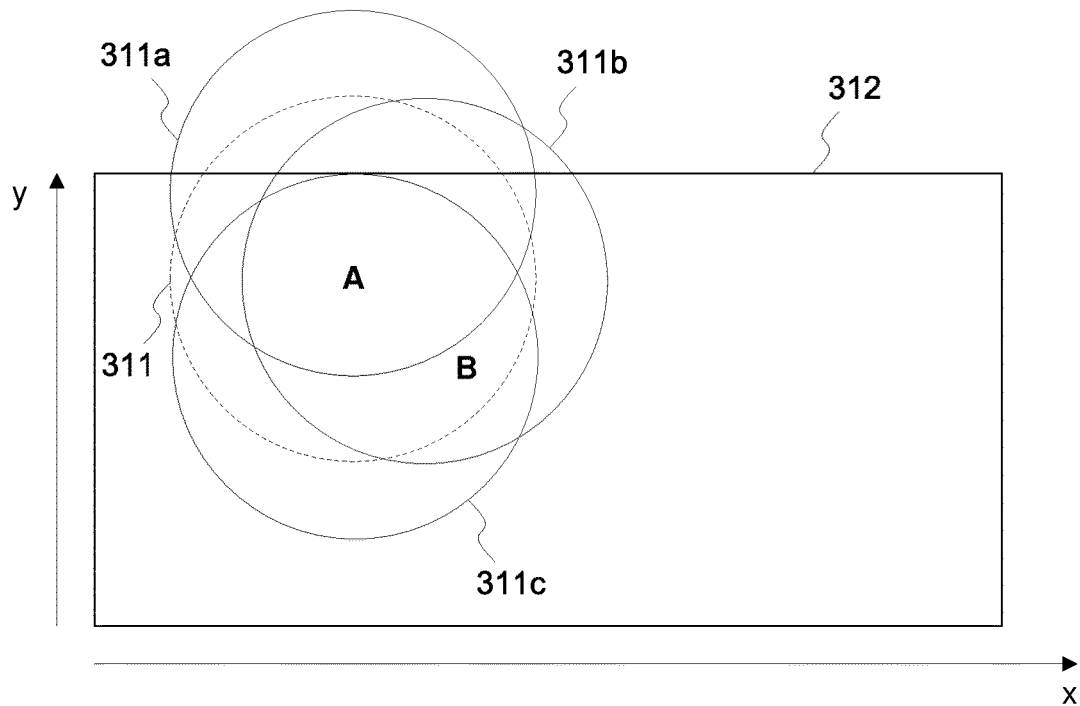
FIG. 9 schematically illustrates a mapping audio focus regions corresponding to a plurality of candidate sound directions and two sound sources in an image area according to an example.

As a non-limiting example in this regard, FIG. 9 schematically illustrates a scenario where respective candidate audio focus regions 311, 311a, 311b and 311c resulting from a scenario where three different offset candidate sound directions in addition to the received audio focus region are available: a first offset candidate audio focus region 311a results from shifting the received focus position in direction of the vertical axis of the image plane (towards the upper edge of the image area) according to a first candidate offset, a second offset candidate audio focus region 311b results from shifting the received focus position in direction of the horizontal axis of the image plane (towards the right edge of the image area) according to a second candidate offset, and a third offset candidate audio focus region 311c results from shifting the received focus position in direction of the vertical axis of the image plane (towards the lower edge of the image area) according to a third candidate offset. In the example of FIG. 9, both the sounds originating from the direction that maps to (the first object depicted in) the position A in the image area and the sounds originating from the direction that maps to (the second object depicted in) the position B in the image area are included in the audio focus regions 311, 311b and 311c, whereas the audio focus region 311a only encompasses the direction that maps to the position A without encompassing the direction the position B.

In the third example, selecting the primary sound direction (cf. block 506) may comprise estimating, for each of the plurality of different available candidate directions, an energy of a respective candidate beamformed audio signal obtainable via usage of the applied beamformer, and selecting one of the candidate sound directions as the primary sound direction based on respective energies of the candidate beamformed audio signals. In one example, the energy of a candidate beamformed audio signal resulting from beamforming according to a certain candidate direction may be derived via carrying out the beamforming using the applied beamformer to derive the respective candidate beamformed audio signal and computing the energy of the respective candidate beamformed audio signal. In another example, the energy of a candidate beamformed audio signal resulting from beamforming according to a certain candidate direction via usage of the applied beamformer may be derived via usage of a directional energy estimation method associated with the applied beamformer, thereby avoiding the computation required for actual derivation of the candidate beamformed audio signals. Such directional energy estimation methods are known in the art.

As a particular example in this regard, selecting one of the candidate sound directions as the primary sound direction may comprise selecting the candidate sound direction that results in the candidate beamformed audio signal having the lowest energy as the primary sound direction. In another example, the energy-based selection of the primary sound direction may be carried out separately for a plurality of frequency sub-bands. Consequently, different one of the candidate sound directions may be selected as the primary sound direction at different frequency sub-bands. In an example, the same energy-based criterion for selecting one of the candidate sound direction as the primary sound direction may be applied over the frequency sub-bands. In another example, the energy-based criterion for selecting one of the candidate sound directions as the primary sound direction may be different from frequency sub-band to another. As an example of the latter, in frequency sub-bands below a predefined frequency threshold the candidate sound direction providing the candidate beamformed audio signal having the lowest energy may be selected as the primary sound direction, whereas in the frequency sub-bands above predefined frequency threshold the candidate sound direction providing the candidate beamformed audio signal having the highest energy may be selected as the primary sound direction.

Referring now to block 508, according to an example the output audio signal may be derived from the received multi-channel audio signal based on the primary sound direction selected via operations of block 506 described in the foregoing by applying a predefined beamformer to extract, from the received multi-channel audio signal, a beamformed audio signal that represents sounds in the primary sound direction of the spatial audio image represented by the received multi-channel audio signal. In another example, if the energy estimation described in the foregoing involved derivation of the candidate beamformed audio signals, the candidate beamformed audio signal resulting the beamforming based on the candidate sound direction that was selected as the primary sound direction (via operations of block 506) may be applied as the beamformed audio signal.

Along the lines described in the foregoing in context of examples pertaining the method 400, in an example the beamformed audio signal may be provided as the output audio signal. In another example, operations pertaining to block 508 may further comprise or be followed by composing, based on the received multi-channel audio signal and the beamformed audio signal, the multi-channel output audio signal with a focused audio component where sounds in directions within the audio focus region 311' around the selected primary sound direction of the spatial audio image are emphasized in relation to sounds in sound directions that are outside the audio focus region 311'. Derivation of such a multi-channel output audio signal may be carried out as described in the foregoing. The multi-channel output audio signal may be provided as or (further) processed into e.g. a two-channel binaural audio signal or a multi-channel surround signal according to a predefined channel configuration (such as 5.1-channel surround sound or 7.1-channel surround sound).

According to a fourth example, provided in the framework of the method 500, selection of the primary sound direction (cf. block 506) comprises carrying out an analysis procedure in an attempt to identify respective sound directions of one or more (directional) sound sources included in the spatial audio image represented by the received multi-channel audio signal and selecting the primary sound direction based at least in part on the identified sound directions.

The analysis procedure comprises applying a set of analysis regions having their respective primary sound directions arranged such that the analysis regions jointly cover or substantially cover the sound directions of the spatial audio image that correspond to the image area in its entirety, thereby enabling identification of respective sound directions of those audio sources that are depicted in the image area (if any). In the following we refer to the primary sound directions of the analysis regions as analysis directions to avoid confusion with the primary sound direction (to be) selected for derivation of the output audio signal via application of the analysis regions. The analysis directions may comprise respective predefined sound directions of the spatial audio image represented by the received multi-channel audio signal that hence map to respective predefined positions of the image area.

Figure 10:
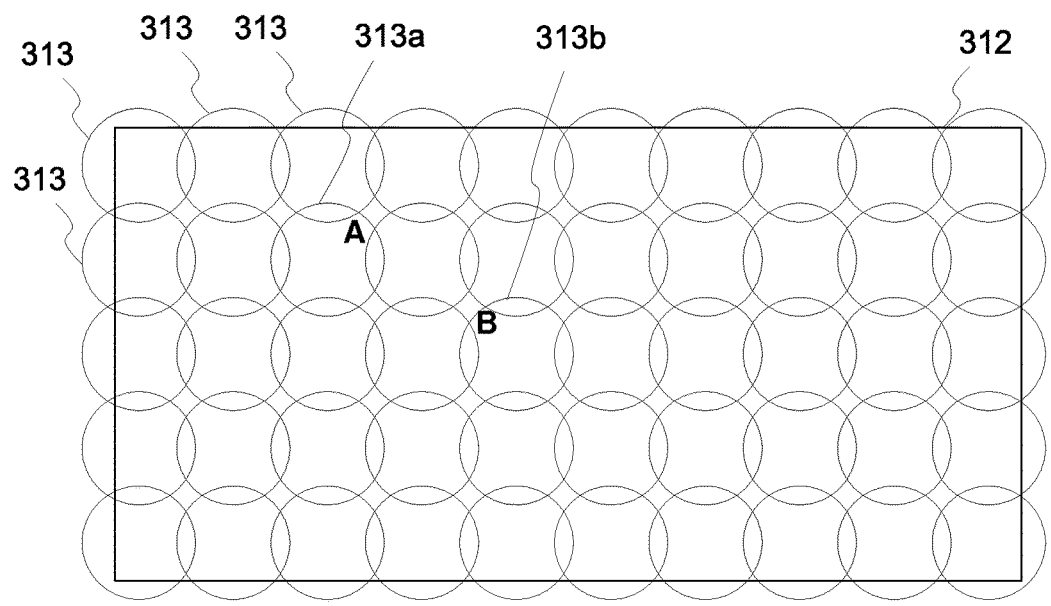
FIG. 10 schematically illustrates a mapping of a plurality of analysis regions and two sound source positions in an image area according to an example.

FIG. 10 schematically illustrates a plurality of analysis regions 313 overlaid on the image area together with the image area positions A and B that again serve to indicate respective image area positions depicting the first and second objects that represent respective sound sources of the spatial audio image. In the example of FIG. 10, each of the analysis regions 313 overlaps with two or more adjacent analysis regions 313, whereas in other examples the overlap between analysis regions 313 may be more substantial than that depicted in the example of FIG. 10 or the analysis regions 313 may be non-overlapping. The analysis regions 313 may be provided using a dynamic beamformer such as the MVDR and the applied beamformer may consider only a sub-portion of the frequency range to enable keeping the analysis regions 313 as small as possible. In contrast, derivation of the output audio signal in dependence of the selected primary sound direction may be carried out using a static beamformer such as the PS, thereby resulting substantially larger (shifted) audio focus regions in comparison to the analysis regions 313, as will be described in the following.

The analysis procedure may comprise estimating, for each of said analysis directions, an energy of a respective preliminary beamformed audio signal obtainable via the applied dynamic beamformer and identifying those analysis directions that result in the respective preliminary beamformed audio signal having an energy that exceeds an energy threshold. In this regard, the energy estimation may be carried out via deriving the respective preliminary beamformed audio signals and computing their energies or via application of a directional energy estimation method associated with the applied dynamic beamformer, along the lines described in the foregoing in context of the third example, mutatis mutandis. The energy threshold may be a predefined energy threshold or the energy threshold may be defined, for example, based on an average audio signal energy over a time window of a predefined duration. The identified analysis directions are considered ones that represent a respective (distinct) sound source. Consequently, selection of the primary sound direction for derivation of the output signal is based in part on the knowledge of the identified analysis directions that represent a respective (distinct) sound source.

As an example, selection of the primary sound direction in dependence of the identified analysis directions may apply the plurality of candidate sound directions described in the foregoing in the context of the third example to identify a candidate sound direction resulting in a respective candidate audio focus region that encompasses smallest contribution in the identified analysis directions, and selecting the identified candidate sound direction as the primary sound direction. Referring to the example of FIG. 10 and assuming that the received audio focus direction maps to (the first object depicted in) the position A in the image area and that the available candidate sound directions include the ones that result in the candidate audio focus regions 311, 311a, 311b, 311c illustrated in FIG. 9, the analysis procedure would result in identifying the analysis directions resulting in the analysis regions 313a and 313b as ones that represent a respective (distinct) sound source. Since in this example the candidate audio focus region 311a encompasses the identified analysis direction that results in the analysis region 313 while the candidate audio focus regions 311b and 311c both encompass the identified analysis directions that results in the analysis regions 313a and 313b, identification of the candidate sound direction that results in the candidate audio focus region that encompasses the smallest contribution in the identified analysis directions would result in identifying the candidate sound direction that yields the audio focus region 311a and, consequently, selecting the identified candidate sound direction as the primary sound direction.

In an example, identification of the candidate sound direction that results in the candidate audio focus region that encompasses smallest contribution from in said identified audio directions may comprise identifying the candidate sound direction that results in the candidate audio focus region that encompasses the smallest number of said identified audio directions. In another example, identification of the candidate sound direction that results in the candidate audio focus region that encompasses smallest contribution from in said identified audio directions may comprise identifying the candidate sound direction that results in a candidate beamformed audio signal having the smallest energy contribution from the identified audio directions.

Consequently, analysis procedure applied in the fourth example enables avoiding emphasizing at least some sound sources in sound directions close to the received audio focus direction but that are preferably excluded from the output audio signal, thereby enabling improved user experience for audio focusing due to improved selectivity arising from avoidance of known spatial positions of undesired sound sources.

Still referring to the fourth example, the analysis relying on the analysis regions spawning from the respective analysis direction and the subsequent selection of one of the available candidate focus directions as the primary sound direction may be carried out separately for a plurality of frequency sub-bands. Consequently, different one of the available candidate sound directions may be selected as the primary focus direction at different frequency bands.

Figure 11:
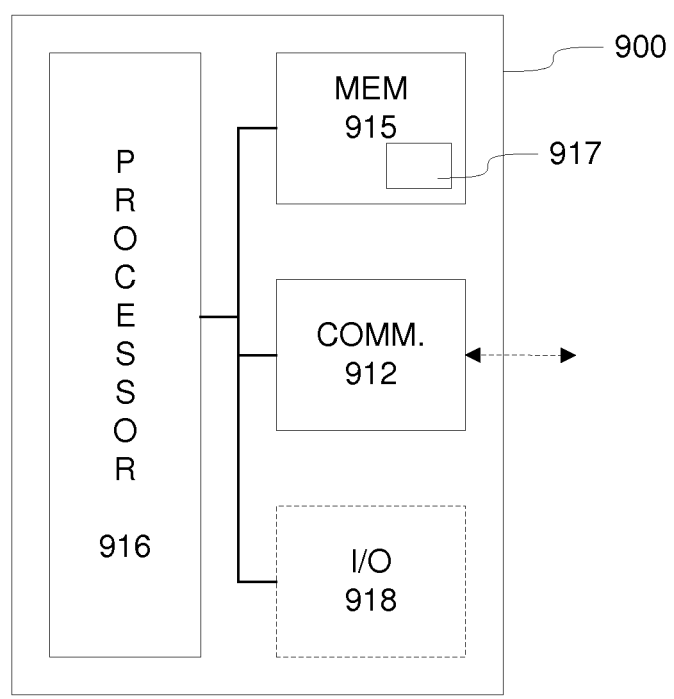
FIG. 11 illustrates a block diagram of some elements of an apparatus according to an example.

FIG. 11 illustrates a block diagram of some components of an exemplifying apparatus 900. The apparatus 900 may comprise further components, elements or portions that are not depicted in FIG. 11. The apparatus 900 may be employed e.g. in implementing one or more components described in the foregoing in context of the media capturing entity 110 and/or the media rendering entity 210.

The apparatus 900 comprises a processor 916 and a memory 915 for storing data and computer program code 917. The memory 915 and a portion of the computer program code 917 stored therein may be further arranged to, with the processor 916, to implement at least some of the operations, procedures and/or functions described in the foregoing in context of the media capturing entity 110 and/or the media rendering entity 210 or one or more components thereof.

The apparatus 900 comprises a communication portion 912 for communication with other devices. The communication portion 912 comprises at least one communication apparatus that enables wired or wireless communication with other apparatuses. A communication apparatus of the communication portion 912 may also be referred to as a respective communication means.

The apparatus 900 may further comprise user I/O (input/output) components 918 that may be arranged, possibly together with the processor 916 and a portion of the computer program code 917, to provide a user interface for receiving input from a user of the apparatus 900 and/or providing output to the user of the apparatus 900 to control at least some aspects of operation of the media capturing entity 110 and/or the media rendering entity 210 or one or more components thereof that are implemented by the apparatus 900. The user I/O components 918 may comprise hardware components such as a display, a touchscreen, a touchpad, a mouse, a keyboard, and/or an arrangement of one or more keys or buttons, etc. The user I/O components 918 may be also referred to as peripherals. The processor 916 may be arranged to control operation of the apparatus 900 e.g. in accordance with a portion of the computer program code 917 and possibly further in accordance with the user input received via the user I/O components 918 and/or in accordance with information received via the communication portion 912.

Although the processor 916 is depicted as a single component, it may be implemented as one or more separate processing components. Similarly, although the memory 915 is depicted as a single component, it may be implemented as one or more separate components, some or all of which may be integrated/removable and/or may provide permanent/semi-permanent/dynamic/cached storage.

The computer program code 917 stored in the memory 915, may comprise computer-executable instructions that control one or more aspects of operation of the apparatus 900 when loaded into the processor 916. As an example, the computer-executable instructions may be provided as one or more sequences of one or more instructions. The processor 916 is able to load and execute the computer program code 917 by reading the one or more sequences of one or more instructions included therein from the memory 915. The one or more sequences of one or more instructions may be configured to, when executed by the processor 916, cause the apparatus 900 to carry out at least some of the operations, procedures and/or functions described in the foregoing in context of the media capturing entity 110 and/or the media rendering entity 210 or one or more components thereof.

Hence, the apparatus 900 may comprise at least one processor 916 and at least one memory 915 including the computer program code 917 for one or more programs, the at least one memory 915 and the computer program code 917 configured to, with the at least one processor 916, cause the apparatus 900 to perform at least some of the operations, procedures and/or functions described in the foregoing in context of the media capturing entity 110 and/or the media rendering entity 210 or one or more components thereof.

The computer programs stored in the memory 915 may be provided e.g. as a respective computer program product comprising at least one computer-readable non-transitory medium having the computer program code 917 stored thereon, the computer program code, when executed by the apparatus 900, causes the apparatus 900 at least to perform at least some of the operations, procedures and/or functions described in the foregoing in context of the media capturing entity 110 and/or the media rendering entity 210 or one or more components thereof. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

Although functions have been described with reference to certain features, those functions may be performable by other features whether described or not. Although features have been described with reference to certain embodiments, those features may also be present in other embodiments whether described or not.

The invention claimed is:

1. An apparatus for audio focusing, the apparatus comprising at least one processor and at least one memory including computer program code, which, when executed by the at least one processor, causes the apparatus to:
   receive a multi-channel audio signal that represents sounds in respective ones of a plurality of sound directions that correspond to respective ones of a plurality of positions in an image area of an image;
   receive an indication of an audio focus direction that corresponds to a first position of the plurality of positions in the image area;
   select a primary sound direction from the plurality of sound directions such that the primary sound direction corresponds to a second position of the plurality of positions in the image area that is defined by shifting the first position into the second position such that the second position is offset from said first position in a direction that brings the primary sound direction further away from a center point of the image area; and
   derive, based on said multi-channel audio signal in dependence of the selected primary sound direction, an output audio signal where sounds in respective ones of the plurality of sound directions defined via the selected primary sound direction are emphasized in relation to sounds in respective ones of the plurality of sound directions other than those defined via the selected primary sound direction.

2. An apparatus according to claim 1, wherein an extent of said offset is at least one of:
   dependent on the location of the first position within the image area; and
   increasing with increasing distance from the center point of the image area.

3. An apparatus according to claim 2, wherein the image area is divided into a plurality of non-overlapping image portions and the extent of said offset is dependent on the non-overlapping image portion within which the first position is located.

4. An apparatus according to claim 1, wherein the direction of offset is at least one of:
   dependent on the location of the first position within image area; and
   along a conceptual line that intersects both the first position and the center point of the image area.

5. An apparatus according to claim 4, wherein the image area is divided into a plurality of non-overlapping image portions and the direction of said offset is dependent on the non-overlapping image portion within which the first position is located.

6. An apparatus according to claim 1, wherein the apparatus caused to derive the output audio signal comprises the apparatus caused to apply a beamformer to extract, from said multi-channel audio signal, a beamformed audio signal that represents sounds in the primary sound direction and wherein the apparatus is caused to select the beamformer for derivation of the output audio signal in dependence on the location of the first position within the image area.

7. An apparatus according to claim 6, wherein the apparatus caused to select the beamformer comprises the apparatus caused to:

select a dynamic beamformer in response to the first position being within a predefined distance from the center point of the image area, and select a static beamformer in response to the first position being further than the predefined distance from the center point of the image area.

8. An apparatus according to claim 7, wherein the static beamformer comprises a phase shift beamformer and wherein the dynamic beamformer comprises a minimum variance distortionless response beamformer.

9. An apparatus according to claim 6, wherein the image area is divided into a plurality of non-overlapping image portions and wherein the apparatus is caused to select the beamformer in dependence of the non-overlapping image portion within which the first position is located.

10. An apparatus according to claim 9, wherein the apparatus is caused to at least one of:

select a dynamic beamformer for an image portion that is bounded by a single edge of the image area and/or for an image portion that is not bounded by an edge of the image area, and select a static beamformer for an image portion that is bounded by two non opposite edges of the image area.

11. An apparatus according to claim 1, wherein the apparatus caused to select the primary sound direction comprises the apparatus caused to select the primary sound direction separately for at least two frequency sub-bands.

12. An apparatus according to claim 1, wherein the apparatus caused to derive the output audio signal comprises the apparatus caused to apply a beamformer to extract, from said multi-channel audio signal, a beamformed audio signal that represents sounds in respective ones of the plurality of sound directions within an audio focus region around the selected primary sound direction, and wherein the apparatus is caused to select the primary sound direction in view of characteristics of said beamformer, such that the audio focus region includes the received audio focus direction.

13. A method for audio focusing, the method comprising receiving a multi-channel audio signal that represents sounds in respective ones of a plurality of sound directions that correspond to respective ones of a plurality of positions in an image area of an image;

receiving an indication of an audio focus direction that corresponds to a first position of the plurality of positions in the image area;

selecting a primary sound direction from the plurality of sound directions such that the primary sound direction corresponds to a second position of the plurality of positions in the image area that is defined by shifting the first position into the second position such that the second position is offset from said first position in a direction that brings the primary sound direction further away from a center point of the image area; and deriving, based on said multi-channel audio signal in dependence of the selected primary sound direction, an output audio signal where sounds in respective ones of the plurality of sound directions defined via the selected primary sound direction are emphasized in relation to sounds in respective ones of the plurality of sound directions other than those defined via the selected primary sound direction.

* * * * *